United States Patent
Shah et al.

(10) Patent No.: US 7,251,131 B2
(45) Date of Patent: Jul. 31, 2007

(54) RUGGEDIZED HOST MODULE

(75) Inventors: Prabodh L. Shah, San Jose, CA (US); Darshan P. Shah, San Jose, CA (US); Allan L. Visitacion, Fremont, CA (US)

(73) Assignee: Olixir Technologies, Milpitas, CA (US)

( * ) Notice: Subject to any disclaimer, the term of this patent is extended or adjusted under 35 U.S.C. 154(b) by 0 days.

(21) Appl. No.: 11/308,228

(22) Filed: Mar. 13, 2006

(65) Prior Publication Data

US 2006/0181845 A1 Aug. 17, 2006

Related U.S. Application Data

(63) Continuation of application No. 10/893,728, filed on Jul. 15, 2004, now Pat. No. 7,012,805.

(51) Int. Cl.
*G06F 1/16* (2006.01)

(52) U.S. Cl. .................. 361/685; 361/727; 360/97.01; 312/332.1; 248/634

(58) Field of Classification Search ................ 361/683, 361/685, 688, 690, 816, 679; 312/223.2, 312/223.1; 360/97.02, 97.01, 97.03–98.01; 248/638, 604, 917, 603; 206/433, 521, 586, 206/521.6, 521.7; 267/136, 141, 141.4, 153, 267/160

See application file for complete search history.

(56) References Cited

U.S. PATENT DOCUMENTS

| | | | | | |
|---|---|---|---|---|---|
| 5,677,813 | A | * | 10/1997 | Yoshida et al. | 360/97.02 |
| 5,999,406 | A | * | 12/1999 | McKain et al. | 361/704 |
| 6,496,362 | B2 | * | 12/2002 | Osterhout et al. | 361/685 |
| 6,621,715 | B2 | * | 9/2003 | Kitadai | 361/801 |
| 6,671,124 | B2 | * | 12/2003 | Guion et al. | 360/97.02 |
| 6,751,092 | B1 | * | 6/2004 | Ohnishi et al. | 361/685 |
| 6,831,830 | B2 | * | 12/2004 | Bruner et al. | 361/685 |
| 2002/0044416 | A1 | * | 4/2002 | Harmon et al. | 361/685 |

\* cited by examiner

*Primary Examiner*—Michael Datskovskiy
(74) *Attorney, Agent, or Firm*—Kyle W. Rost

(57) ABSTRACT

An energy dissipative element (24) protects hard disk drives (22, 72, 92) from shocks and vibrations. A closed elastic envelope (48) houses a body of open cell foam (54), a volume of viscous liquid (56), and a compressible gas (64). Under compression or expansion of the foam (54), viscous liquid (56) flows through cell orifices and thereby dissipates energy resulting from external force applied against the elastic wall (48). The energy dissipative elements (24) are applied between a disk drive housing (22) and an outer case (26) to create a ruggedized portable disk drive module (20).

8 Claims, 16 Drawing Sheets

RUGGEDIZED HOST MODULE

CROSS REFERENCE TO RELATED APPLICATIONS

This application claims the benefit under 35 U.S.C. 120 as a continuation of U.S. patent application Ser. No. 10/893,728 filed Jul. 15, 2004, now U.S. Pat. No. 7,012,805, issued Mar. 14, 2006.

BACKGROUND OF INVENTION

1. Field of the Invention

The invention generally relates to electro-mechanical devices. More specifically, the invention relates to a housing or mounting assembly with diverse electrical components, especially to electronic systems and devices. The invention relates to methods and apparatus for cushioning of a computer peripheral from mechanical shocks and vibrations, especially a memory unit peripheral such as a disk drive. The method and apparatus employ highly viscous fluids that flow readily at ordinary ambient temperatures, operative in a porous elastic structure.

2. Description of Related Art Including Information Disclosed Under 37 CFR 1.97 and 1.98

The term "disk drive" may refer to any of several types of devices, including but not limited to hard disk drives, floppy disk drives, and optical disk drives such as CD and DVD drives. These disk drives share a common characteristic of having one or more rotating recording media disks, and having a transducer positioned over a surface of the media. Disk drives also share the characteristic of being highly susceptible to damage, in part due to external shock and vibration and in another part due to internally generated vibrations that are not sufficiently damped by the disk drive mounting.

A drive using fixed rotating disks inside it is called a fixed disk drive. A drive using removable disks enclosed in an envelope is called a removable media disk drive and the envelope containing the disks is called a removable disk cartridge. When the fixed disk drive itself is enclosed in an envelope and a shock resistant system is placed between them, then this assembly is called a removable drive module. A removable disk cartridge is removable from a disk drive while a removable drive module is removable from a docking device installed in a computer or an array chassis. Examples of removable disk cartridges include both industry standard floppy disks and removable hard disk cartridges. Many manufacturers supply floppy disks. The 3.5-inch form factor designation does not necessarily refer to any dimension of a drive, itself. Rather, it refers to size of the disk that is designed to fit into the drive. Examples of removable disk cartridges include commercially available products supplied by companies such as Iomega, Castlewood and SyQuest. DataZone Corporation of Felton, Calif., manufactures and sells a prior art removable drive module under the trademark, DataBook. The drive module can utilize an optical disk drive, a tape drive and other such drives besides hard, magnetic disk drives.

One application of the present invention relates to removable drive module technology. In known prior art, foam, polymeric material, mechanical springs or a combination of these materials and devices provide shock and vibration protection to a disk drive. However, these fall short of achieving the shock protection needed for a drive to survive a variety of common impacts, which can produce shock at a level reaching approximately 5,500 Gs for a 3.5-inch disk drive and 13,000 Gs for a 2.5-inch disk drive. The present invention overcomes this limitation.

The following patents show state-of-the-art damping schemes. Such prior art includes U.S. Pat. No. 6,351,374 to Sherry; U.S. Pat. No. 6,249,432 to Gamble et al.; U.S. Pat. No. 6,154,360 to Kaczeus Sr. et al.; U.S. Pat. No. 5,837,934 to Valavanis et al.; U.S. Pat. Nos. 4,638,383 and 4,568,988 to McGinlay et al., and U.S. Pat. No. 3,384,221 to Houtman. These patents provide limited teachings that refer only to foam materials, which do not achieve the desired degree of protection.

U.S. Pat. No. 6,154,360 to Kaczeus, Sr., et al. is assigned to DataZone Corporation. It shows a data storage subsystem that purports to be capable of withstanding several four-foot drops. A data storage device such as a hard disk drive is partially surrounded by a specially configured foam enclosure, formed, for example, of polyurethane foam. In turn, the foam enclosure and 2.5-inch disk drive are encased within a shock resistant module housing, such as one formed of high impact plastic. Within the module housing, the foam enclosure surrounds the narrow periphery of the disk drive and supports both the top and the bottom broad surfaces of the disk drive. The module housing is slotted for ventilation.

U.S. Pat. No. 6,249,432 to Gamble et al. discloses a removable hard disk drive mounted in a carrier or tray for insertion into a docking bay. A three-component vibration damping system reduces vibration between the hard disk drive and the carrier and between the carrier and the docking bay of a computer using such drives. One component is composed of polymeric material and is located between the exterior of the carrier and the interior of the docking bay. A second component of similar polymeric material is located between the interior of the carrier and the exterior of the hard disk drive with an interference fit. The third component employs metal or polymer springs and polymeric pads located between the exterior sides of the carrier and the interior sides of the docking bay. This patent relates only to disk drives and not to general packaging and protecting of objects and systems.

U.S. Pat. No. 6,351,374 to Sherry discloses a hard disk drive module having a protective cover housing or a modular case. The module uses insulator foam or other resilient material on one side or edge of the unit so as to maintain engagement with the other side or edge of a modular case. The resilient material can reduce shock to the disk drive unit due to impact on either the case or the chassis. Even a flexible cable leading to an electrical connector is attributed with the qualities of a shock absorber. Thus, this patent teaches a degree of shock absorption, but the extent of shock absorption appears to be low.

U.S. Pat. No. 5,837,934 to Valavanis et al. presents the use of foam sheets to provide shock absorption. It neither anticipates nor suggests applications for protecting other objects, systems, or devices by use of viscous means.

U.S. Pat. Nos. 4,638,383 and 4,568,988 to McGinlay et al. teach an anti-vibration mount using an elastic rubber material known as AVM 206 for disk drives. This mount material has a capability of 40 Gs of non-operating shock from the elastic deformation property of the material. The shock absorption of this class of elastic or rubber materials is limited compared to what is required to address non-operating shocks reaching a level of 5050 Gs. This patent employs no viscous means to protect a disk drive from shock or vibration.

U.S. Pat. No. 3,384,221 to Houtman claims the invention of adding a plurality of fingers or cuts in foam padding used for shock protection. A package can be dropped from a maximum height of 76.2 cm (30 inches). Under conditions where prior art shock would be 47.8 Gs, Houtman's transmitted shock is within 11 Gs. However, this patent neither suggests nor discloses the use of viscous liquid to damp shock or vibration.

Additional prior art includes U.S. Pat. No. 6,347,411 to Darling; U.S. Pat. No. 6,339,532 to Boulay et al.; U.S. Pat. No. 6,039,299 to Ohnishi et al.; U.S. Pat. No. 5,995,365 to Broder et al.; U.S. Pat. No. 5,965,249 to Sutton et al.; and U.S. Pat. No. 5,510,954 to Wyler. These patents mention the use of viscous materials. However, they do not anticipate the methods and apparatus used in the present invention.

U.S. Pat. No. 6,347,411 to Darling discloses the use of viscous liquids and micro-balloons but does not present an interaction between a viscous liquid and an elastic, self-forming structure. Viscous liquid is used to dissipate energy within a closed cell material that entraps the liquid. The viscosity of the liquid is specified between 100,000 centistokes (cs) and 2,000,000 centistokes. These very high viscosity fluids are characterized as solids that exhibit cold flow or creep. Various testing measures the characteristics of materials that cold flow or creep at low rates. The viscous fluids are encapsulated and entrapped within a cell to provide dissipation of shock energy at the microscopic and molecular level of the viscous fluid. In contrast, the present invention provides for dissipation of energy at the macroscopic level where liquid flows between cells of an internal structure and inside of an external membrane.

U.S. Pat. No. 6,339,532 to Boulay et al. discloses mounting a disk drive by a layer of viscoelastic material, such as double-sided foam tape, between the drive and an enclosure. Primary and secondary mounting plates may employ the viscoelastic material between them, and these plates should have aligned ventilation holes for cooling. This mounting controls internally and externally developed vibration relative to a disk drive but does not extend the performance capabilities to protect it from operating or non-operating shock. The viscoelastic material, sandwiched between two plates, dampens vibrations that may otherwise affect recording device performance or cause tracking errors. However, Boulay does not suggest the use of a viscous liquid for damping. Rather, a viscoelastic material in the form of a foam pad damps operational vibration but does not protect from shock. Further, the protective mounting primarily is effective during operation, when the device is mounted into an enclosure. Thus, Boulay does not envision protection of a device outside of the enclosure.

U.S. Pat. No. 6,039,299 to Ohnishi, et al. discloses a viscous damper for a disk-reproducing unit. The damper consists of a viscous fluid and two elastic cavities connected by a tube to a protuberant cavity. Damping occurs due to shear forces at irregular formations of both surfaces of the cavities and involves flow through the single orifice of the connecting tube. This technology is applied to a disk-reproducing unit that is always found in a manufacturing area. As such, it is not subject to the shock danger encountered by a portable device. This patent is readily distinguished from the present invention in that it does not suggest the use of an open celled material or a structure providing a multitude of orifices.

U.S. Pat. No. 5,995,365 to Broder, et al. teaches the use of flexible cables to reduce the transfer of shock forces among electronic components such as a motherboard and a hard drive-carrier assembly. The Broder patent also teaches a method of using articulated arms as shock absorbers. This teaching does not suggest an encapsulated viscous liquid that transfers to and from elastic open cells to dissipate shock and vibration. The energy dissipation is at a molecular level and not at a macroscopic level as envisioned in the present invention.

U.S. Pat. No. 5,965,249 to Sutton, et al. teaches a cold flowing material with high internal cohesion forces. Fluid is entrapped between cells of porous material. Molecular level dissipation within the fluid produces damping. Cold flowing material produces only small displacements on a microscopic scale. Thus, it is unlikely that such materials can absorb shocks up to 5,500 to 13,000 Gs.

U.S. Pat. No. 5,510,954 to Wyler teaches acoustic shielding. A key element is a fluid impervious barrier layer located next to sound absorptive porous foam. No liquid is located within the cells of the porous foam. A pouch contains liquid, but this liquid is separated from the foam layers by an impervious membrane of the pouch. The acoustic shielding employs no viscous liquid or porous elastic structure.

Various other patents show background art. U.S. Pat. No. 5,546,250 to Diel uses an elastomer seal to cover the frame of a drive and absorb external loads applied to the edges of the housing. The protection system is applied to a disk drive perimeter rather than to a module. U.S. Pat. No. 4,891,734 to More et al. shows the use of an elastomer body to encapsulate an electronic assembly that is confined in a closed cavity of a structure subject to vibration and shock. U.S. Pat. No. 5,216,582 to Russell et al. describes a housing assembly that forms a fixed disk drive module for a low profile fixed disk drive that is shock-mounted therein. Both More and Russell use elastomer supports to protect from shock and vibration.

As an example of the available technology in a current commercial product, the Maxtor XT 5000 external hard drive uses two plastic structures which cover four corners and two long edges of the case. The Maxtor 5000XT manual warns not to bump, jar, or drop the drive. The Maxtor specification for this drive is 250 G for linear shock.

Other literature references provide pertinent background. In a pioneering work, Dynamics of Package Cushioning, R. D. Mindlin describes the dynamics of package cushioning in terms of mathematical formulations. C. W. Radcliffe applies a viscous fluid damper to problems of prosthesis in Biomechanical Design of a Lower-Extremity Prosthesis. Specifically, a vane or a piston is used to move a viscous liquid from one chamber to another through a carefully designed orifice to affect a desired performance characteristic for a prosthetic knee mechanism.

Various commercial devices employ viscous liquids. For example, automobile shock absorbers operate with viscous liquids. Many industries use similar devices, with rigid chambers to hold the viscous fluid and orifices to control its flow.

Still other literature references show the importance of shock and vibration protection in the disk drive industry. See, for example, Stevens, L. D. et al: Magnetic Recording Technology; Chen and Kumano: The Efficacy of Mechanical Damper in Actuators for Rotating Memory Devices; Lilley, D. T.: The Discussion of Some Engineering Trade-offs in Winchester Disk Drive Isolation and Shock Protection; and The Effects of Shock & Vibration on Rigid Disk Drives, by ATASI Corporation.

The above prior art analysis contrasts the essential or often occurring elements of certain embodiments of the present innovation. The present invention comprises additional embodiments that may or may not include all the elements listed above. All observations provided herein are directed to optional aspects of the present invention and are in no way expressions of limitations to the full scope of the present invention.

Portable Data Storage—According to standards established by various authorities, a minimum requirement for portability of disk drives is the ability to survive multiple drops from a height of 91.44 cm (36 inches) onto a hard surface. Prior art devices have had difficulty in meeting this standard while conforming the product to the popular 3.5-inch form factor. The best-known performance in the prior art is by DataZone Corporation, which supplies a commercially available hard disk drive cartridge. This product uses a foam enclosure inside of a shock resistant housing. This product faces the shortcoming of not conforming to the popular 3.5-inch form factor. The size of the DataZone cartridge housing is larger than that of the popular 3.5-inch form factor hard disk drive, evidently because the excessive size is required to sufficiently protect the disk drive. The DataZone module provides little if any protection against external shock for a 3.5-inch form factor hard disk drive. The product apparently is limited to the use of 3.0 inch and smaller hard disk drives.

Removable media can meet the minimum shock requirement for portability. Iomega, SyQuest and Castlewood are commercial producers that have shipped hard disk drive devices using removable media. The hard disk is contained in a portable cartridge that can be removable from the drive. An inherent problem with removable media for hard disk drives is that the media becomes contaminated, and this contamination transfers to the transducer in the drive. To counter the effects of the contamination, the recording capacity of the media is relatively decreased and the reliability of the overall system is compromised.

Floppy disk, CD, and DVD are other removable media. These media are much less susceptible to contamination. However, the capacity of the recording media is 0.01% to 1.0% of the capacity of a comparable size hard disk drive. These low capacities limit the application and usefulness of the removable media disk drives. In addition, the large numbers of floppy disks, CDs, and DVDs, which are often needed and used, require a large and carefully cataloged library. This same information is better stored on a single hard disk drive that has electronic means for cataloging.

There is a need for a disk drive module that can withstand high, non-operational G-shock and meet vibration specifications for commercial and personal use. These specifications define levels of shock and vibration that the device must safely and reliably withstand at a minimum.

Shipments of Disk Drives—There are design standards for common carrier shipments based upon size and weight of a container and whether the package is shipped on or off a pallet. Special shipping containers have to be designed to protect all shipments of disk drives. A percentage of common carrier shipments experience shocks in excess of the design standards, resulting in costly damage and possible loss of data. Individual disk drives are shipped in expensive and bulky boxes lined with foam or other bulky, shock absorbing, paper-based material.

Environmental concerns and new laws require recycling of packing materials. Foam and other polymeric materials are extremely difficult to recycle. Secondary shipment costs of these packaging materials are high because they have to be used in large volumes for adequate protection of delicate peripherals or instruments.

There is a need for a disk drive module that can withstand high G-shock for shipment by common carriers, eliminating the need for the design of special and expensive shipping containers.

Disk Drive Mounting—Whether the hard disk drive is mounted as a single component in a system or as an array of many disk drives, the mounting design is crucial to obtaining optimum performance and enhanced reliability. Previous mounting schemes use foams, polymeric materials, viscoelastic materials, mechanical springs or a combination of these materials and devices to provide the required shock and vibration damping to the disk drive.

These previous mounting schemes either mount the drive to a solid member of a case that incorporates shock and vibration damping material or mount the drive in a cartridge or module having shock and vibration isolation and damping. The cartridge or module is then attached to a solid member of the case, with or without damping materials.

The design requirements for these mounting schemes are becoming more critical because:

1) Disk drive rotational speeds are increasing. Typical rotational speeds for hard disk drives have increased from 5400 rpm to 7200 rpm, with some drives now rotating at 10,000 rpm and 15,000 rpm. Slight imbalances will result in large vibrations and/or large forces that will accelerate component wear and induce damage to the drive(s).

2) Larger dense arrays of disk drives require smaller individual contributions in vibration forces from each individual drive. The drives are all rotating at the same speed. Thus, the probability of exciting natural vibration frequencies between the elements of the array is high.

Building of systems incorporating hard disk drives requires careful handling of each and every hard disk drive. Currently, during the process of removal from the shipping container and installation into a system or system module, there is no significant protection afforded to the hard disk drive. Typically, this operation is done by semi-skilled labor, worldwide. The largest numbers of hard disk drive failures happen during this installation process.

There is a need for a disk drive module that can both protect the hard disk drive during system assembly and meet the vibration and shock requirements. This is irrespective of whether the system uses a single hard disk drive or an array of disk drives.

Commonality of Form Factor—The high volume production growth in the disk drive industry is supported by common form factors.

Form factors for 3.5-inch, 3.0-inch, 2.5-inch, 1.8-inch, and 1.0-inch devices are well defined and accepted worldwide. However, there is no accepted form factor for a hard disk drive module. Besides the DataZone ruggedized module form factor, there are other, un-ruggedized modules of different dimensions being offered by many companies. These modules are not interchangeable for numerous reasons, size being one of them.

It would be desirable to define a form factor for hard disk drive modules or to conform to an existing form factor. This advance would lead to increased module manufacturing, higher volumes, and reduced costs. Producing a maximum protection for shock and vibration within a fixed form factor is a further competitive advantage. The smallest form factor module of the present invention provides high G-shock protection to the 3.5-inch form factor hard disk drive, which is the largest form factor in high volume production.

To achieve the foregoing and other objectives and in accordance with the purpose of the present invention, as embodied and broadly described herein, the method and apparatus of this invention may comprise the following.

SUMMARY OF INVENTION

Against the described background, it is therefore a general object of the invention to provide improved protection from shock and vibration for electronic devices, especially disk drives and other data storage devices, which may by portable or fixed.

Another object is to create a ruggedized data storage subsystem, preferably enabling the use of common form factors such as 3.5-inch, 3.0-inch, 2.5-inch, 1.8-inch, and 1.0-inch form factors.

According to the invention, an energy dissipative element is used for protecting a hosted device from deleterious effects of mechanical shocks and vibrations. The energy dissipative element has a closed envelope formed of an elastic, resilient wall that encloses an internal volume. A porous body of elastic material is contained within the internal volume of the closed envelope. The porous body defines a network of cells interconnected through cell orifices suitably configured for passing viscous liquid between cells. A viscous liquid is contained within the envelope and fills at least a portion of the network of interconnected cells. A compressible gas also occupies a portion of the internal volume of the envelope. Under compression or expansion of the porous body, the viscous liquid flows through the cell orifices and thereby dissipates energy resulting from an external force applied against the elastic wall.

The closed envelope can be made of latex rubber, such as from latex rubber tubing. The opposite ends of the tube are sealed to create the closed envelope. A suitable seal can be chosen from a bonded seal, an adhesive seal, a compression seal, and any combination of these. A bonded seal can be achieved by vulcanizing the latex rubber at the ends of a tube. An adhesive seal can be achieved by gluing shut the end of a tube. Adhesives such as cyanoacrylate glue are suitable. A mechanical or compression seal can be achieved by applying a band of shrinkable material to a tube end and shrinking the band, thereby compressing shut the end of the tube.

Open cell foam is one type of porous body that defines a network of cell orifices with relatively small apertures between juxtaposed cells. Substantial portions of the cell orifices are relatively smaller in transverse dimension than the cells interconnected by them so that the viscous liquid is restrained during movement between cells. A preferred viscous liquid is polydimethylsiloxane (PDMS). Suitable viscosity is less than 20,000 centistokes (cs). A preferred viscosity range is between about 1,000 cs and about 50 cs, with 500 to 1000 cs being a still more preferred range.

According to another aspect of the invention, a host module assembly protects a hosted device from shock and vibration. The assembly includes a case or container configured to receive a hosted device therein and to receive at least one mechanical energy dissipative element between the hosted device and the case. A hosted device and at least one mechanical energy dissipative element are located within the case. The mechanical energy dissipative element is formed of a closed envelope having an elastic, resilient wall that defines an enclosed internal volume. A porous body of elastic material is contained within the internal volume of the closed envelope. A compressible gas also occupies a portion of the internal volume of the envelope. The porous body defines a network of cells interconnected through cell orifices suitably configured for passing viscous liquid between cells. A viscous liquid is contained within the envelope, filling at least a portion of the network of interconnected cells. Under compression or expansion of the porous body, the viscous liquid flows through the cell orifices and thereby dissipates energy resulting from an external force applied against the elastic wall.

The hosted device can be a disk drive with a traditionally shaped, box-like housing having six faces arranged in three opposite pairs of faces. The case is suitably sized to receive at least one mechanical energy dissipative element between each face of one or more opposite pairs and the case. Correspondingly, at least two of the mechanical energy dissipative elements are located between the disk drive housing and the case, with at least one between each of the opposite faces of at least one pair of opposite faces of the disk drive housing and the case. At least one mechanical energy dissipative element can be located between each of the six faces and the case.

The hosted device can have one or more pairs of opposite sides and can carry a pair of rails on one or more pairs of the opposite sides. At least one of the mechanical energy dissipative elements is located between each of the rails and the case.

The case is configured with at least one external corner edge. A bumper formed of elastomer material is attached over the corner edge. A preferred elastomer material for the bumper is of 35 dm to 75 dm.

In a specifically desirable version of the invention, the hosted device is a disk drive and the case is a common form factor envelope. The resulting structure provides a ruggedized disk drive module. The disk drive can be selected from 3.5-inch, 3.0-inch, 2.5-inch, or 1.0-inch form factor disk drives. The case can be adapted for mounting into a computer system, with the result that the mechanical energy dissipative element provides the protection from shock and vibration during the installation of the disk drive module into a computer system. Either a single disk drive cartridge or a plurality can be mounted into a computer system. The mechanical energy dissipative element is functional to protect against shock and vibration during the installation of a plurality of the disk drive modules into a dense array of disk drives in a computer system. The case also may be a container used in handling a disk drive during manufacture or installation, protecting the disk drive from shock and vibration during handling.

The hosted device can be a portable electronics device. Suitable examples are a personal digital assistant (PDA), camera, camcorder, or liquid crystal diode (LCD) panel.

Another aspect of the invention is a method of dissipating energy released due to external forces that cause mechanical shocks and vibrations to a disk drive. Placing a plurality of closed elastic envelopes around the disk drive carries out the method. Open cell material is provided within each of the envelopes. The open cell material has orifices communicating at least some of the cells with one another. At least some of the cells are filled with a viscous liquid material. In response to an external mechanical force applied on the elastic envelope, the envelope deforms. It forces the viscous liquid through the orifices from one cell to another. This dissipates energy from the external mechanical force.

The method may include further steps of returning the elastic envelope essentially to its original shape due to the energy stored in the envelope as a result of its deformation. This also returns the viscous liquid through the orifices from one cell to another by forces generated within the viscous liquid.

According to another aspect of the method, a hosted device is protected from shock and vibration while carried in a host module assembly. The hosted device is isolated from direct reception of shock by attaching side rails to opposite edges of said hosted device. Elastic dampers are applied between the side rails and the host module in sufficient number and position to suspend the hosted device within the host module without substantial shock-transmitting contact with the host module other than through the side rails and dampers.

At least some of the dampers are constructed of an elastic envelope containing a body of open cell material having orifices communicating at least some of the cells with each other. A viscous liquid fills at least some of the cells, and another portion of the envelope contains a compressible gas within an air space.

The accompanying drawings, which are incorporated in and form a part of the specification, illustrate preferred embodiments of the present invention, and together with the description, serve to explain the principles of the invention. In the drawings:

DETAILED DESCRIPTION

Figure 1:
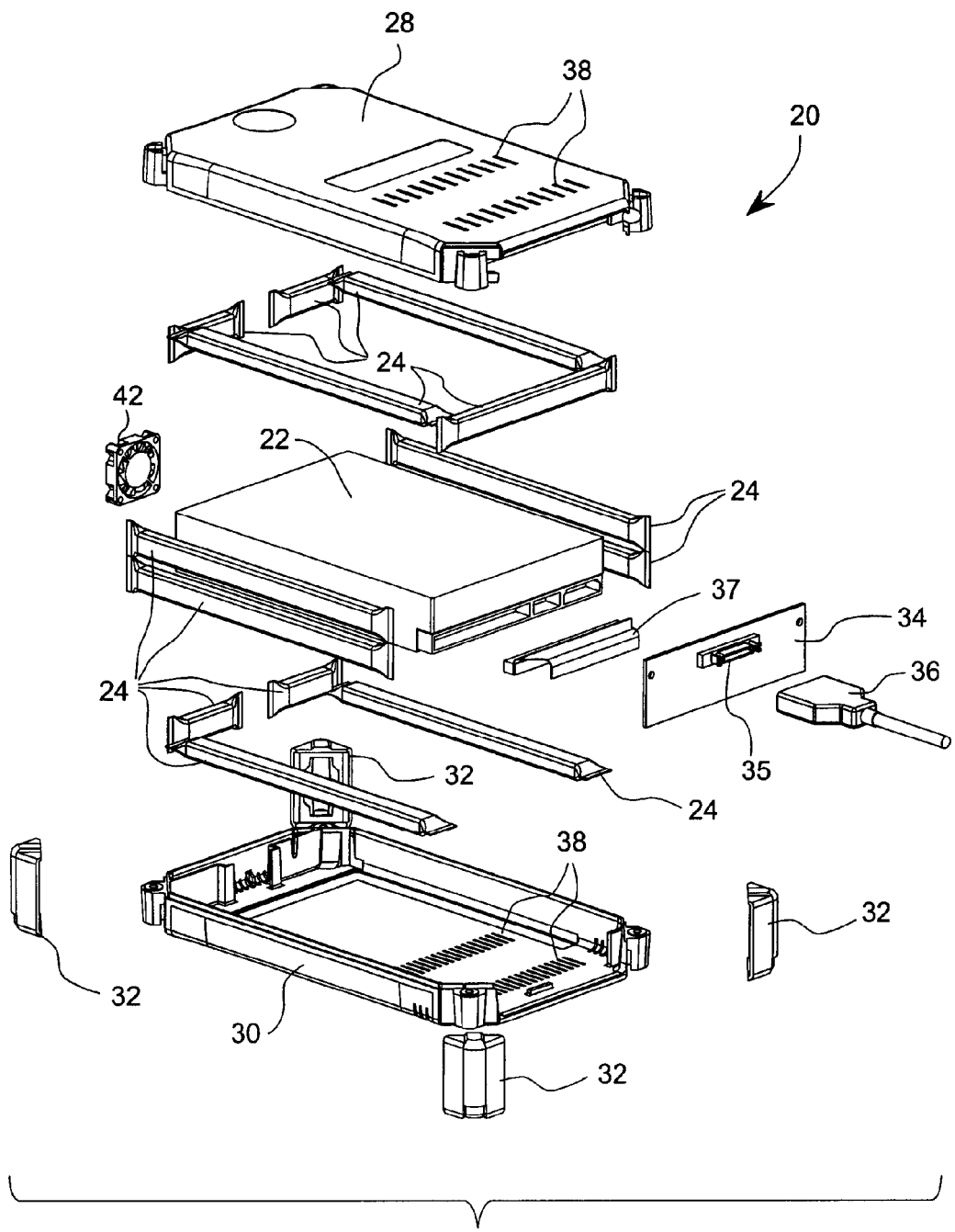
FIG. 1 is an exploded isometric view taken from the upper left rear of a portable host module assembly employing mechanical energy-dissipative elements, including optional features.

The invention is a ruggedized host module capable of protecting a hosted device from mechanical shock and vibration. A mechanical energy-dissipative element (MEDE) is effective in protecting the hosted device from many types of mechanical shock and vibration. The energy-dissipative element is well suited for use in a portable host module for a hosted device. For example, a fixed disk drive or a removable disk drive are typical hosted devices that may be packaged in a portable casing to create a removable drive module. The MEDE can be used between the hosted device and the casing to protect the hosted device. In this application, the MEDE enables an expanded range of products to be offered in standard form factors, in which the hosted device must be compactly packaged to fit within dimensionally specified limits.

Protection is possible from shock or vibration in many modes. The energy-dissipating element can protect by reducing external shock from free falls or drop by attenuating internal self-exciting vibration forces, by attenuating acoustic energy emanating from the hosted device, or by increasing heat transfer from the hosted device. Particularly when the hosted device is a disk drive, it is a significant advantage that a damping structure operates effectively when placed between a disk drive and an encasing module to attenuate internal self-exciting vibration forces emanating from a disk drive. Thus, terms such as shock and vibration refer to end results that may be initiated from any source or cause, including the hosted device, itself, or external events.

Hosted devices are not limited to disk drives. Numerous portable electronics devices may beneficially serve as hosted devices. Common examples include personal digital assistants (PDAs), flash memory drives, cameras, camcorders, and liquid crystal diode (LCD) panels. Further, hosted devices need not be portable. Fixed disk drives and other sensitive devices can benefit from protection even when mounted in large or stationary racks, cabinets, cases, and housings. A particularly pertinent example is a collection of similar fixed disk drives as often assembled in a RAID array. However, many types of equipment and devices can benefit by damping inter-equipment effects, whether the devices are of the same type or different types.

Further, the hosted device need not be in operation or in a functional individual or group mounting. Protection also is necessary during transportation and handling, such as when a hosted device is in a shipping container. The MEDEs also can be effective when applied between hosted devices, individually or in modules, and between hosted devices and a shipping container. Each hosted device can be protected both from other hosted devices and from the boxing or crating as may be used during bulk transportation. Also, the MEDE can protect a hosted device during other phases of handling, such as during installation.

The energy-dissipative element is a cost effective means for protecting any disk drive during shipment and installation. In an exemplary embodiment described in greater detail hereinafter, the slim module is configured to provide maximum protection for a 3.5-inch form factor hard disk drive as well as to fit into a bay or docking device that occupies a standard 5.25-inch form factor bay within a personal computer (PC). The standard latter bay is 14.6 cm (5.75 inches) wide. In addition, the module provides vibration damping by viscous means. This permits use of drives with very high rotation speeds in system arrays, which typically generate an increased level of vibration. The same module utilizing a 2.5-inch form factor drive will withstand shock greater than 10,000 Gs. Viscous damping gives better protection than that obtained by using a single or a combination of foam pads. Additionally, viscous properties of the material provide improved heat transfer and vibration and acoustic damping.

An exemplary embodiment is a module consisting of a 3.5-inch form factor hard disk drive and a set of viscous damping devices placed between the hard disk drive and a case made from shock resistant plastic. This module protects the hard disk drive from shocks applied in all 6 axes (3 of translation and 3 of rotation). The internal hard disk drive signal and power connections are applied using a flex PCA cable, flat cable and printed circuit board assembly (PCBA) located at one end of the module. PCBA output can be connected to various kinds of external interface cables or to a bay or docking device. Power to the stand-alone module is applied via a mini-DIN connector mounted on to the internal PCBA.

The dimensions of a 3.5-inch form factor hard disk drive module are 35 mm×115 mm×190 mm (1.38 in×4.53 in×7.54 in). This module is slightly larger in size than a commercially available DataZone 2.5-inch ruggedized module, but it can slide into the selected bay or docking device.

The present invention provides a method and a system that dampens mechanical shock and vibration by means of a mechanical energy dissipative element (MEDE). Each MEDE consists of numerous interconnected cells containing a viscous, nonconductive liquid and often a header of compressible gas. A matrix of such interconnected cells may be provided in open cell elastic foam. A membrane, such as a membrane of foam material, defines each cell, and many of the cells house a pocket of viscous liquid. The vast majority of these cells have at least one aperture through which the viscous liquid can enter or exit the cell and flow from one cell to a juxtaposed cell. Each aperture is significantly smaller in transverse dimension or cross section than the cells it interconnects. A relatively small aperture, as compared to the dimension of the cells, is desirable so that the aperture provides a restriction against liquid transit to or from the cell. The open cell foam, viscous liquid, and compressible gas header are contained in a sealed elastic housing that has shape memory so that after being deformed under compression or expansion, it tends to return to an original or known prior configuration.

A preferred open cell foam is urethane foam supplied by E-A-R Specialty Composites of Indianapolis, Ind. Foams sold under the trademark Confor, and especially Confor CF-EG, are suitable. Densities and stiffness differentiate several foams in this product line, which include CF-47 Green, CF-45 Blue, CF-42 Pink, and CF-40 Yellow. The following tables provide representative data for each of the four listed foams and thereby provide guidance for selection of suitable alternate foams.

TABLE 1

PROPERTIES OF CONFOR FOAMS (ENGLISH)

|  | CF-47 Green | CF-45 Blue | CF-42 Pink | CF-40 Yellow |
|---|---|---|---|---|
| Nominal Density (pcf) ASTM D3574 | 5.8 | 5.8 | 5.8 | 5.8 |
| Bal Rebound (%) ASTM D3574 | ≦-.0 | ≦-.0 | ≦-.0 | ≦-.0 |

TABLE 1-continued

PROPERTIES OF CONFOR FOAMS (ENGLISH)

|  | CF-47 Green | CF-45 Blue | CF-42 Pink | CF-40 Yellow |
|---|---|---|---|---|
| Compress on Set (%) ASTM D3574 22 hr at 158 = Compressed 26% Compressed 50% | 0.3<br><br><br><br>0.6 | 0.4<br><br><br><br>0.6 | 0.9<br><br><br><br>1.0 | 0.6<br><br><br><br>2.4 |
| Indentation Force Deflection ASTM D3574 Test B 1 (modified) 25% Deflection: 72 F. at 60% Relative Humidity | 43 | 24 | 26 | 15 |
| Tensile Strength (lbf/in) ASTM D3574 20 in/min at 72 F. | 25.2 | 22.3 | 15.1 | 14.6 |
| Tear Strength (lbf/in) ASTM D3574 20 in/min at 72 F. | 5.6 | 4.6 | 3.4 | 1.6 |
| Elongation (%) ASTM D3574 20 in/min at 72 F. | 98 | 108 | 109 | 135 |

TABLE 2

PROPERTIES OF CONFOR FOAMS (METRIC)

|  | CF-47 Green | CF-45 Blue | CF-42 Pink | CF-40 Yellow |
|---|---|---|---|---|
| Nominal Density (kg/m³) ASTM D3574 | 93 | 93 | 93 | 93 |
| Bal Rebound (%) ASTM D3574 | ≦-.0 | ≦-.0 | ≦-.0 | ≦-.0 |
| Compress on Set (%) ASTM D3574 22 hr at 70 C. Compressed 26% Compressed 50% | 0.2<br><br><br><br>0.6 | 0.4<br><br><br><br>0.6 | 0.9<br><br><br><br>1.0 | 0.6<br><br><br><br>2.4 |
| Indentation Force Deflection ASTM D3574 Test B 1 (modified) 25% Deflection: 22 C. at 50% Relative Humidity | 43 | 24 | 26 | 15 |
| Tensile Strength (kPa) ASTM D3574 65 cm/min at 22 C. | 174 | 154 | 125 | 10 |
| Tear Strength (kN/m) ASTM D3574 61 cm/min at 22 C. | 0.96 | 0.81 | 0.60 | 0.28 |
| Elongation (%) ASTM D3574 61 cm/min at 22 C. | 98 | 108 | 109 | 135 |

CF-45 Blue and CF-47 Green are especially preferred foams for use in MEDEs for 3.5-inch form factor disk drives or similar other hosted devices. CF-42 Pink has utility for use MEDEs with lighter weight hosted devices such as 2.5-inch form factor disk drives. Confor foams are known for use as shock absorbing pads in disk drives and can dissipate up to 97 percent of shock energy without recoiling and amplifying the effect. In hard disk drives, the foam alone can help protect against handling-related damage. Confor foam formulations, including CF-EG foams, are engineered to compress and conform under sustained pressure and to slowly rebound when the shock is released. When the foams receive a direct impact, they behave like semi-rigid foams, resist collapse and absorb the impact internally.

When mechanical forces, such as those caused by shock, vibration and acoustic waves, act to compress portions of an essentially open celled MEDE, the mechanical energy is dissipated by generation of forces that simultaneously drive pockets of viscous liquid through the apertures of the cells. After the period of compression of the MEDE by an external force has ended, the MEDE regains its original shape due to elastic nature of the housing and of the open cell material and due to capillary action. The expansion of the compressed cells and the elastic envelope will continue until the viscous liquid returns to an established equilibrium state.

In many applications of the present invention, the MEDE comprises the following essential elements: an elastic structure having a plurality of open cells; viscous, electrically nonconductive liquid distributed within the open cells; compressible gas, and an envelope enclosing these elements.

The viscous liquid dissipates the energy of a mechanical shock due to highly frictional shear forces within the liquid and between the liquid and cell walls as the liquid passes through narrower channels leading between the individual open cells and between cells and the interior of the envelope. The liquid flow can be observed on a macroscopic level. The liquid and cells thereby provide a means to absorb and redirect undesirable mechanical energy that might otherwise damage or affect a hosted device in absence of such means.

The envelope is formed of an elastic material that: (a) helps the material within the MEDE to redistribute the viscous liquid and air into the open cells after a mechanical shock has dissipated, and (b) permits the MEDE to regain its original shape. The elastic envelope material may provide additional shock absorption by acting like a spring deformed by an external mechanical force to store and subsequently release the energy.

The fluids contained within the envelope are both a gas and a liquid. Air is a suitable gaseous fluid of very low viscosity. Preferred open cell foam is polyurethane foam. Such foams are known to have some internal damping at the molecular level of the gas but none at a macroscopic scale as envisioned in the present invention. The present invention teaches the use of a highly viscous liquid flowing from one cell to another of the open cell foam or equivalent material and to and from the preferred embodiment with an elastic membrane enclosure of the MEDE. The envelope may be composed of latex tubing.

With reference to the drawings, FIG. 1 shows a portable module assembly 20 in an exploded view. Main components include a hosted element 22 which may be a disk drive, such as a 3.5-inch form factor hard disk drive, or other shock sensitive component. A plurality of MEDEs 24 surrounds the hosted element. A typical hosted device 22 has one or more pairs of opposite sidewalls or faces. As shown, a common configuration is block-like shape with six housing faces arranged in three pairs: a top and bottom, and two pairs of sides. The top and bottom are major faces, two relatively longer sides are intermediate faces, and two relatively shorter sides are minor faces.

For protecting a hosted element configured similarly to a typical fixed disk drive as shown in FIG. 1, MEDEs are configured in appropriate lengths for the shape of the hosted device and to accommodate the hosted device's cooling needs. A set of five MEDEs 24 protects the top of the hosted device, arranged around the top perimeter. A set of two MEDEs is located on each longer sidewall of the hosted device, and two MEDEs protect bottom of the hosted device. In the illustrated configuration, the topside MEDEs include a MEDE across the front edge of the top, while the bottom side MEDEs do not cover the front edge because an airflow inlet is located at that position.

Figure 2:
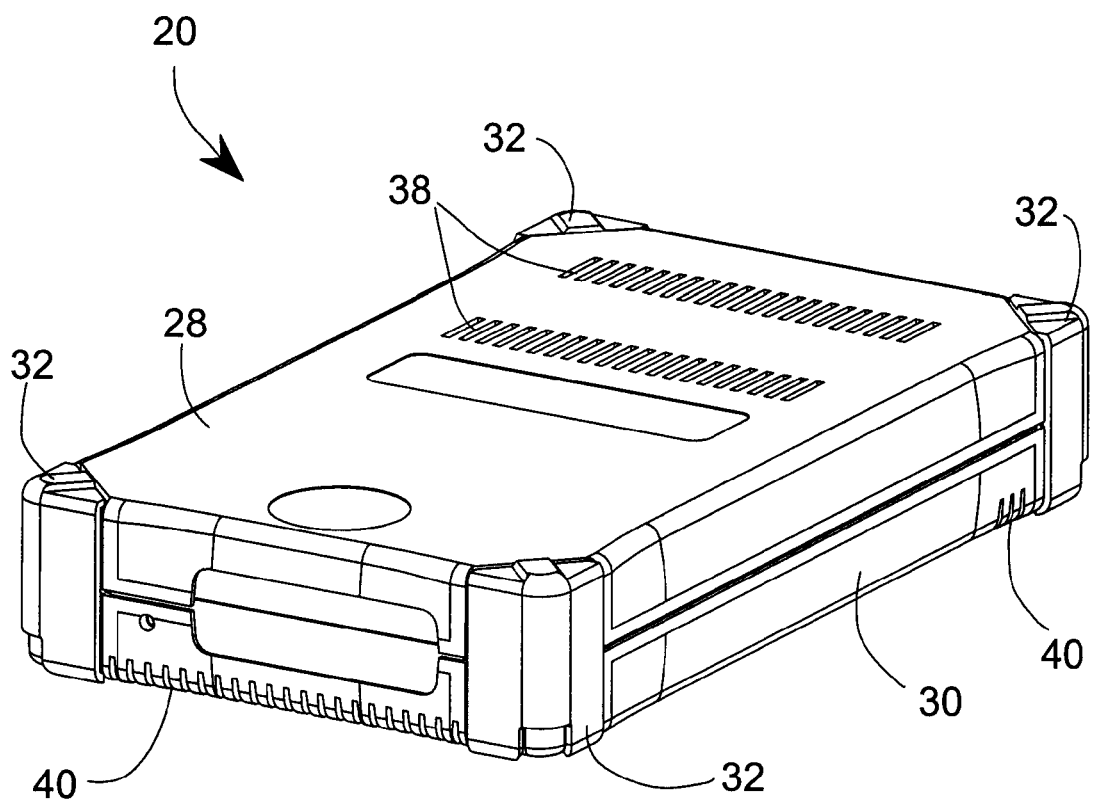
FIG. 2 is an isometric view taken from the front left side of the assembled module of FIG. 1.
Figure 3:
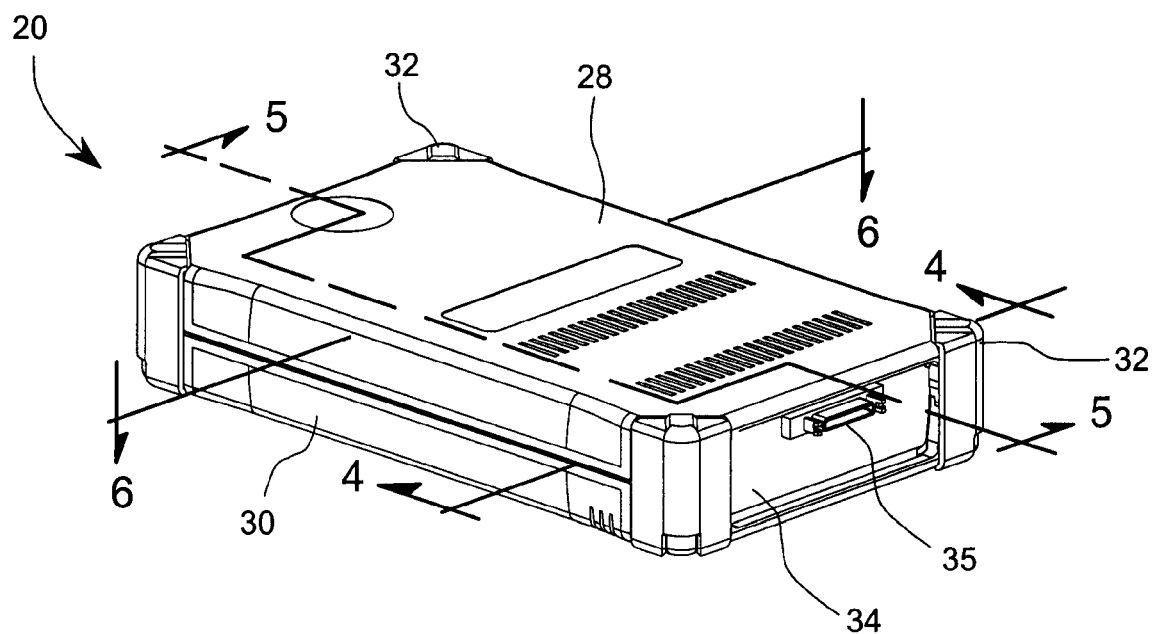
FIG. 3 is an isometric view taken from the rear right side of the assembled module of FIG. 1.

The module 20 includes a case 26, FIGS. 2 and 3, which receives the hosted device. The MEDEs are mounted inside the case. The case includes a top cover unit 28 and a bottom cover unit or base 30 that mate to surround the hosted device 22. The top cover 28 defines a top surface of the case, which is a major face. The bottom cover 30 defines a bottom surface of the case, which is another major face. A perimeter skirt surrounds the top and bottom surfaces, each forming part of the sidewalls. When the top cover and bottom cover are mated at a joining line, their perimeter skirt walls define four sidewalls of the case, arranged as two opposite pairs of walls. The two pairs of sidewalls meet at four minor outside edges that may also be referred to as corner edges. Each end of a corner edge is a corner of the case. These corners are likely to strike the ground first when the module is dropped, so corner bumpers specially protect them and secure the top and base.

Figure 6:
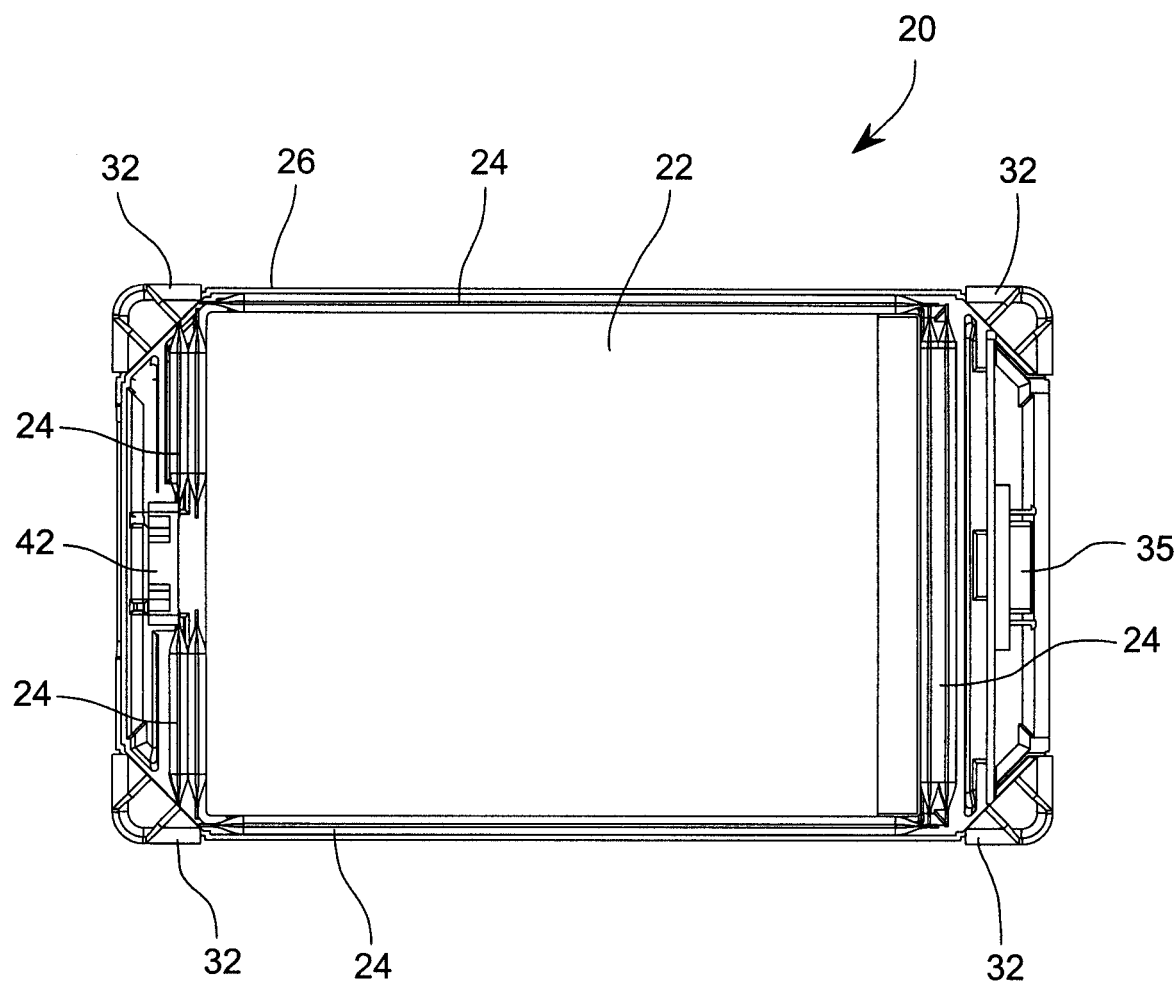
FIG. 6 is a cross-section taken at a horizontal plane through line 6-6 of FIG. 3.

The various MEDEs 24 are attached to the juxtaposed portions of the case 26 or are attached to the contained, hosted device by any suitable fastening means, which conveniently may be double-sided tape or other adhesive. MEDEs 24 may have an initial thickness of 3 mm (0.12 inch). When installed inside a closed case, these MEDEs may be compressed into an available space of 0.2 mm (0.08 inch), thus resulting a preload of forty percent. In some applications, the case may have a greater spacing to the hosted device than the thickness of a single MEDE. FIG. 6 shows that multiple MEDEs 24 may be assembled in layers, such as at the front and rear ends of the hosted device, to fill available space. Where MEDEs are used in layers, they may be held together, such as by double-sided tape, for purposes of assembly.

Corner bumpers 32 provide additional shock and vibration protection for the hosted device and protect the case corners. In FIG. 1, four corner bumpers 32 are attached respectively to the four minor outside corner edges of case 26. Each bumper 32 has sufficient height to extend beyond the top and bottom walls of the case. Each bumper preferably is formed of an elastomer, and an elastomer material of thirty-five to seventy-five dm is preferred. The four minor corner edges of the case also serve as a suitable location for fastening the top and base of the case together with suitable fasteners such as screws. The bumpers 32 may cover and engage the four fastener locations. The bumpers can be molded or transfer molded with rubber compounds using well-known processes. The bumpers 32 are applied to the case 26 after cover 28 and the base 30 are assembled to form the completed case 26. Because bumpers 32 are located at the minor corners edges of module case 26, the bumpers are highly likely to encounter first in contact with an impacting surface when the module is dropped. The bumpers 32 reduce the transmitted shock to the case 26 and in turn reduce the transmitted shock to the hosted device 22. The bumpers 32 form a permanent part of module 20 and provide a protective function during shipping, handling and installation. The bumpers provide multi-axis shock protection.

Optional components of the module 20 are a circuit board 34 with a cable interface 35, an internal flex cable 37 between the circuit board and the hosted device, and an external cable 36 configured to engage the cable interface of the circuit board 34. The board 34 typically transmits input/output signals from the hosted device, and cable 36 conveys signals to and from a computer. These optional components typically are used when the hosted device is a hard disk drive. Other optional elements may be selected and adapted for use as required for the needs of different hosted devices.

The MEDEs 24 in the illustrated configuration support the mass of a 2.54 cm (1-inch) high hard disk drive. The case size for a 3.5-inch form factor hard disk drive is 35 mm×115 mm×190 mm (1.38 in×4.53 in×7.54 in). The case 26 beneficially can be made from impact resistant plastic having properties similar to Cycoloy brand plastic, sold by General Electric Plastics as item C2950. Cycoloy is an ABS plus polycarbonate plastic, unfilled, injection grade. It has 40% elongation at break, Izod impact strength of 9.93 ft-lb/in, and is coated with a conductive film on the inside for RFI shielding.

Figure 4:
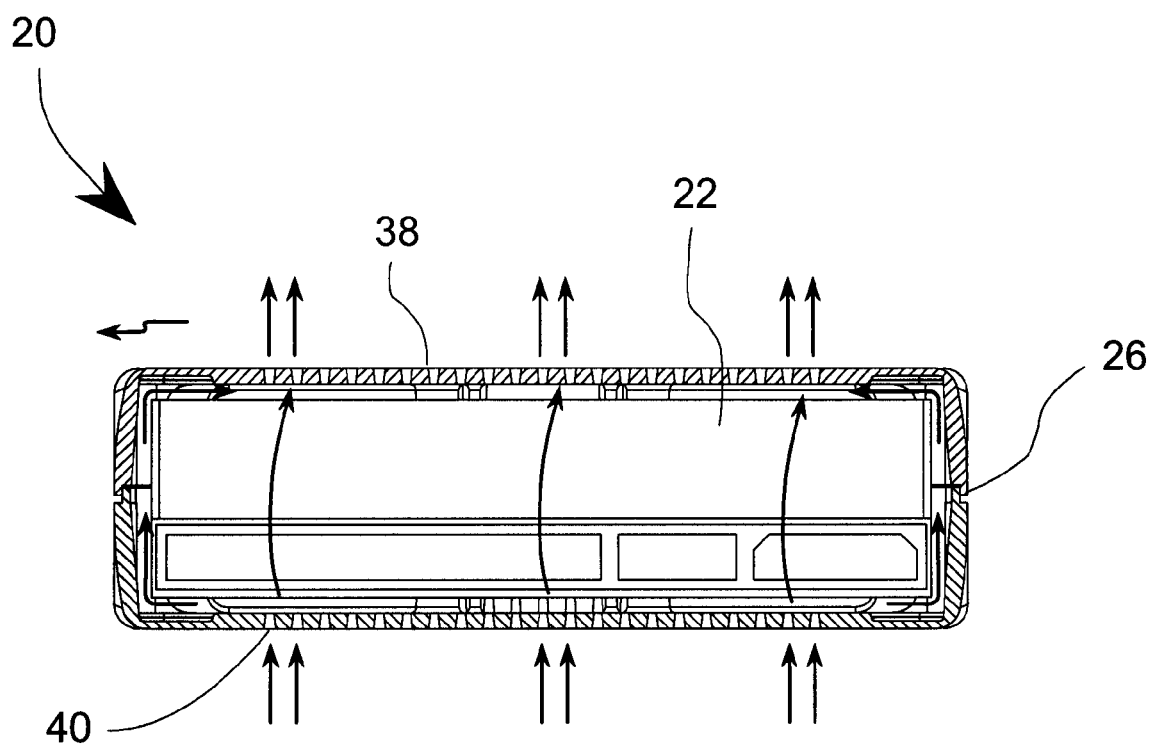
FIG. 4 is a transverse cross-section taken at a vertical plane through line 4-4 of FIG. 3, showing airflow through the module.
Figure 5:
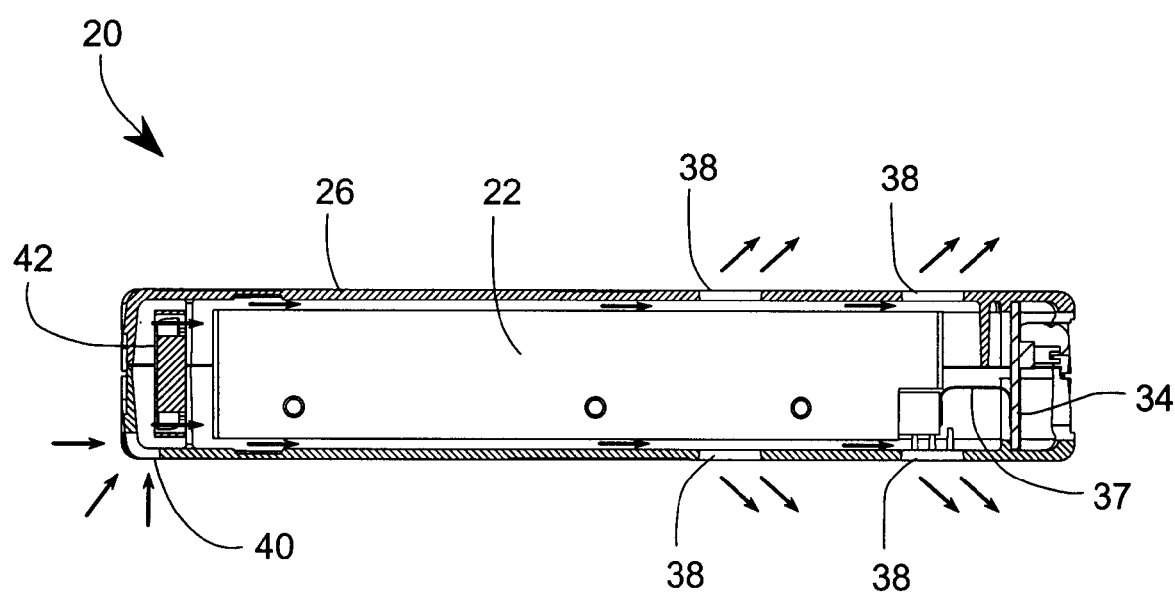
FIG. 5 is a longitudinal cross-section taken at a vertical plane through line 5-5 of FIG. 3, showing airflow through the module.

A desirable case configuration includes large slots 38 formed in cover 28 and base 30. Additional, possibly smaller slots 40 may be formed in the edges of base 30 or other locations and are best shown in FIGS. 4-6, where flow arrows suggest a path of cooling air through the housing 26. All of the slots contribute to conductive and convective heat transfer, which cools the hard disk drive or other hosted device. Another optional component, a fan 42, provides forced air-cooling.

A fully assembled portable module 20, FIGS. 2 and 3, houses a hosted device and MEDEs 24 within case 26. The bumpers 32 are shown in position on the minor corner edges to protect all corners of module 20 and cover the corner screw locations. Arrows in FIGS. 4-6 show a convective airflow pattern for cooling the hosted element. The compact structure of the MEDEs enables this pattern when arranged as shown in FIG. 1. Notably, other types of shock protection that employ foam pads may block airflow and cause overheating difficulties.

The portable module 20 can be used in several different environments. In the embodiment of FIG. 5, the module 20 is suited for tabletop use. Airflow indicated by the arrows in FIG. 5 show a free convection pattern. Both natural convection currents through the interior of the module assembly and conduction through the thermally conductive viscous liquid in the MEDEs dissipate internal heat from the housing 26. The optional fan 42 enables forced convection. Airflow entering the front of the case 26 and exiting at the top and bottom of the case dissipates internal heat through forced convection flow.

Figure 7:
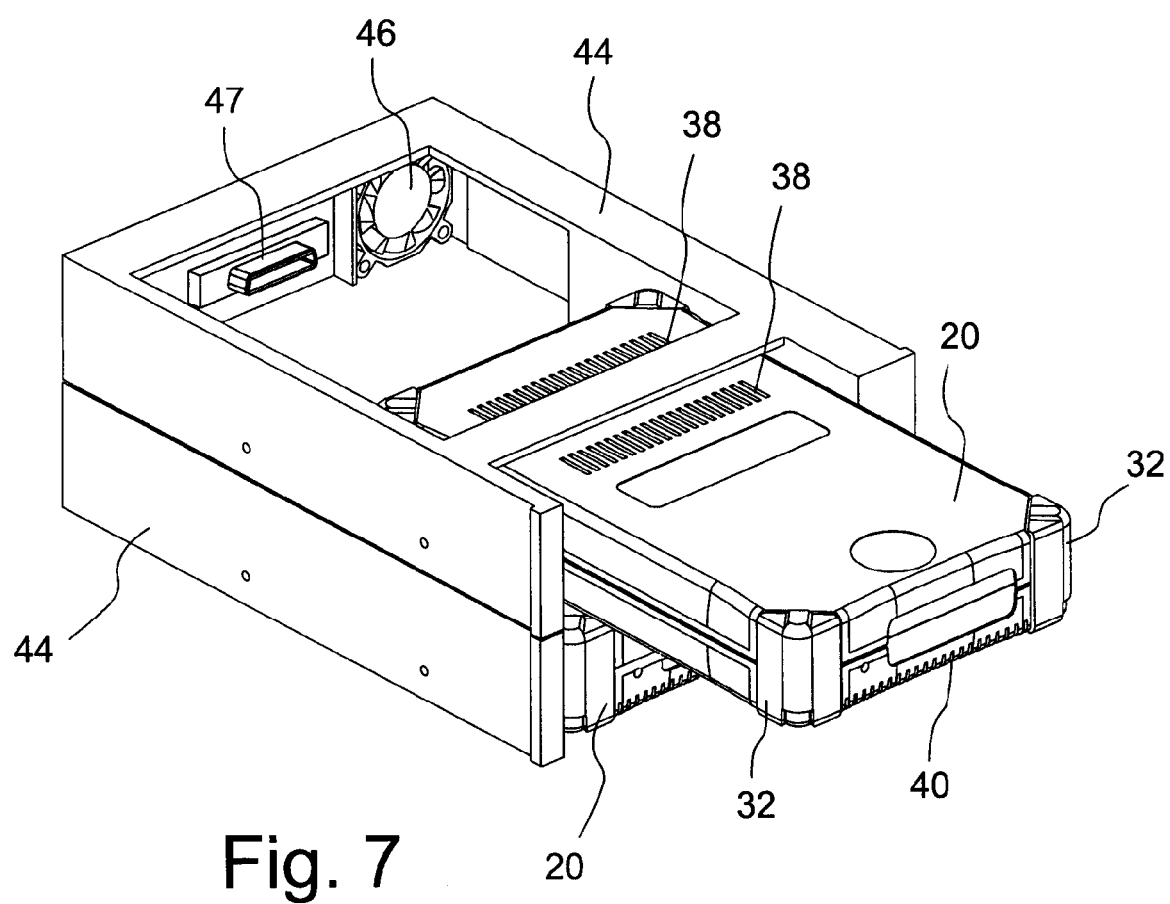
FIG. 7 is an isometric view of a first portable hosted module in ejected position within a docking device and of a second portable hosted module in inserted position.
Figure 9:
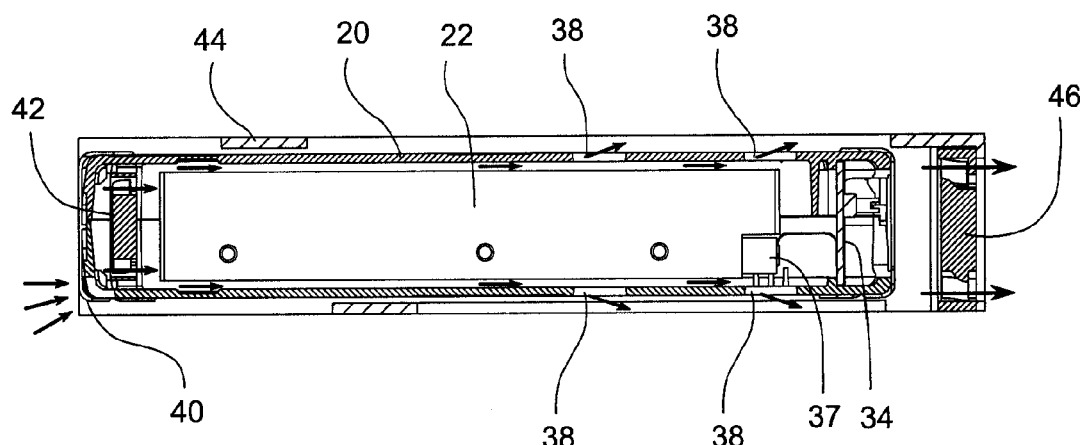
FIG. 9 is a cross-sectional view taken at a vertical plane through line 9-9 of FIG. 8. For clarity in showing airflow paths, mechanical energy dissipative elements are omitted from this view.

In another operating environment, one or more modules 20 are installed in docking devices 44, such as in the array of two such docking devices 44 shown in FIG. 7. The upper module shown in FIG. 7 is in partially ejected configuration and shows a fan 46 located at the inner end of the upper docking device 44. The fan 46 is distinct from the optional fan 42 in portable module 20, shown in FIG. 5. One or both fans can be used, as shown in FIG. 9. The lower module 20 is fully inserted into the lower docking device 44. FIG. 7 also shows that a plurality of modules 20 can be mounted in an array that might be either part of a desktop computer or part of a rack system, discussed more fully below.

Figure 8:
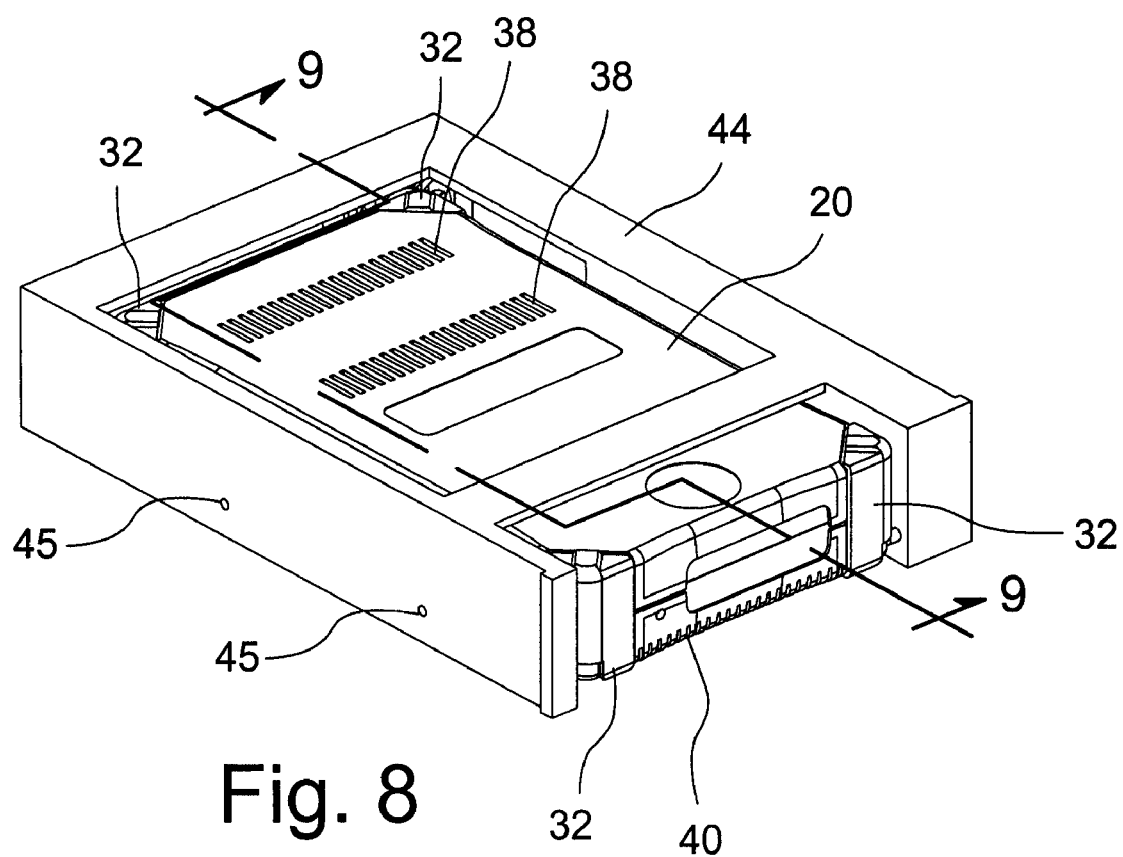
FIG. 8 is an isometric view of a portable hosted module in inserted position within a docking device.

Still other operating environments include desktop computers and rack systems. In desktop computers, disk drives are placed in traditional 5.25-inch form factor bays that are generally available for their installation. Many mounting systems are known, including rails and screw-in mountings. Mirroring boxes typically have two such spaces, and rack-mounted or tower RAID boxes have a plurality of such spaces. A docking device 44 may occupy such a bay. In FIG. 8, the screw holes 45 provide a means of mounting a docking device 44 in a standard bay. The shock-resistant case 26 is suitably sized to slide into the docking device 44 as shown in FIGS. 7 and 8. The case provides the additional advantage of making the module 20 portable. It may make use of mating connectors, such as a Centronics or an equivalent male connector 35 located on the board 34 inside the module 20 and a corresponding mating female connector 47 on the board of docking device 44. Generally, hot swap can be achieved with such a module 20 in a docking device 44.

One of the benefits of the MEDE dampers is that they attenuate complimentary vibrations between similar devices, such as a plurality of fixed disk drives in a RAID array. A single mirroring function (RAID 1) can be implemented within a two bay box. A multiplicity of RAID functions can be implemented in an eight bay, 3U wide tower or rack-mounted 3U high chassis. RAID 0, 1, 0+1, 3 and 5 configurations are typically achieved in tower or rack-mount boxes. Generally, it takes a combination of three to eight modules 20 to achieve RAID architecture and the corresponding redundancy. The portable module 20 is ideally suited for use in RAID configurations since it is portable and capable of withstanding high levels of vibration and shock.

Figure 10:
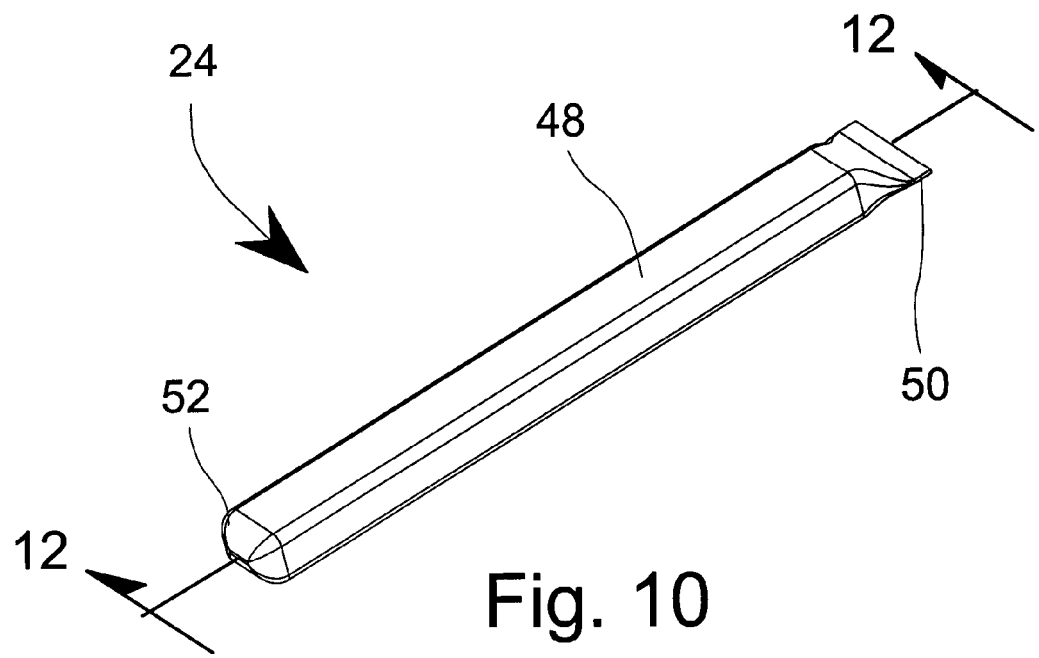
FIG. 10 is an isometric view of a mechanical energy-dissipative element in uncompressed condition.
Figure 11:
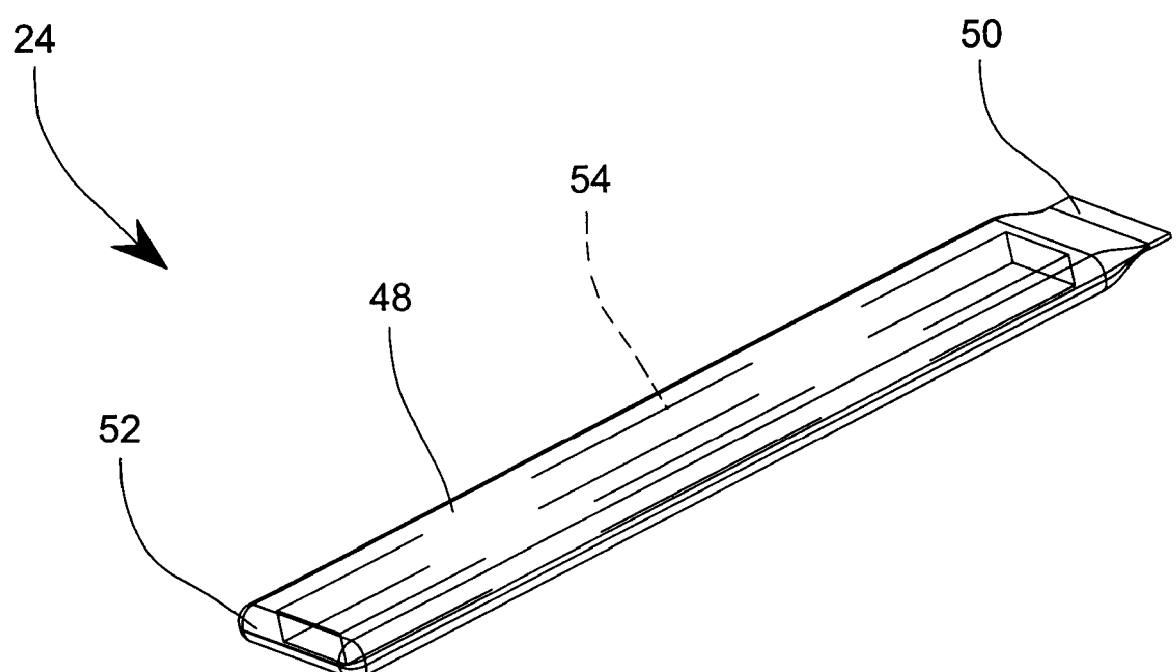
FIG. 11 is an isometric view of a mechanical energy-dissipative element in compressed condition, with a compressed open cell foam body inside an outer envelope shown in phantom.
Figure 12:
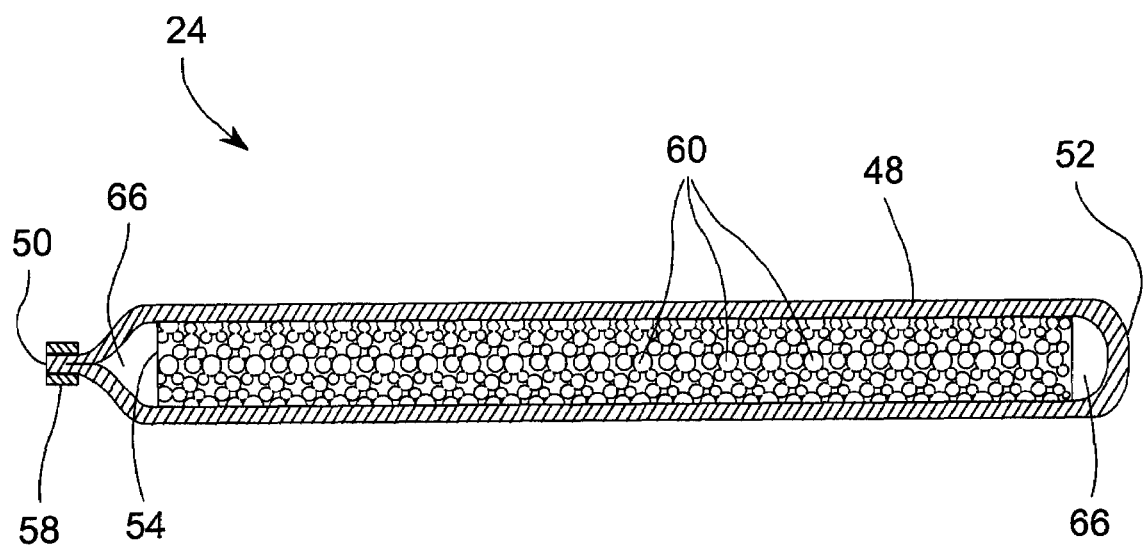
FIG. 12 is a cross-sectional view of a mechanical energy-dissipative element taken along a vertical plane through line 12-12 of FIG. 10.

FIGS. 10-12 show the structure of a MEDE 24. An external skin or envelope 48 serves as a housing and contains other components of the MEDE. A highly resilient material such as latex rubber is the preferred material for forming the envelope. An especially effective and efficient shape is longitudinally elongated, resulting in a latex tube being a good choice. At least one end of a tube conveniently is open for inserting additional components into the envelope. The embodiments of FIGS. 10-12 show one end 50 that has been sealed after inserting components into the tube. The second and opposite end 52 may be identical to the first end 50. Alternatively, the second end 52 may be originally formed as a closed end, as shown in the drawings.

The envelope 48 contains a body 54 formed of elastic, resilient, open cell foam. FIG. 12 shows a matrix of interconnected cells in which the aperture between two cells tends to be of substantially smaller cross-sectional area than either of the cells, themselves. Typical aperture areas may be ten percent to twenty-five percent or more of the cross-sectional area of an adjacent cell. Thus, the apertures provide restriction to flow of viscous liquid. However, due to capillary action and applied positive or negative pressure, the viscous liquid is flowable through the cells. The external geometry of the open cell foam 54 determines the geometry of the envelope 48.

The envelope also contains viscous liquid 56, which may be dispersed throughout the envelope and the open cells of the foam 54. The amount of viscous liquid 56 within the envelope and foam inside it is controlled to fill the cells of the foam, fully or partially, so that a desired shock response is obtained. As an example, a MEDE about four inches long contains about two milliliters of 1,000 cs viscosity silicone fluid. Longer and shorter MEDEs, respectively, may contain proportionately more or less silicone fluid. The following example illustrates how the MEDEs are structured and sized in one useful embodiment.

EXAMPLE 1

The portable module 20 houses a 3.5-inch disk drive weighing 680 gm (24 ounces) and uses thirteen MEDEs. The materials and their respective dimensions are as follows:

13 MEDEs per module (finished lengths approximate):

1. 4 MEDEs @ 13.34 cm (5.250 inch) finished size.
2. 1 MEDE @ 8.57 cm (3.375 inch) finished size.
3. 4 MEDEs @ 0.59 cm (1.5 inch) finished size.
4. 4 MEDEs @ 13.34 cm (5.25 inch) finished size.

Materials Needed:

1. Latex tubing, 0.254 mm (0.010 inch) wall thickness, 9.53 mm (0.375 inch) I.D. (Kent Elastomer, Kent, Ohio, USA).

EXAMPLE 1-continued

The portable module 20 houses a 3.5-inch disk drive weighing 680 gm (24 ounces) and uses thirteen MEDEs. The materials and their respective dimensions are as follows:

2. Open-celled polyurethane foam, Confor CF-47 Green, 9.53 mm (0.375 inch) wide, 3.175 mm (0.125 in) to 6.35 mm (0.25 in) thick (E-A-R Specialty Composites, Indianapolis, Indiana, USA).
3. Viscous Liquid - polydimethylsiloxane (PDMS), viscosity 1.000 cs. (Aldrich Chemicals, Sigma-Aldrich Corp., St. Louis. Missouri, USA).
4. Vulcanizing fluid. Rema Tip Top (North American, Inc.), Northvale New Jersey, USA); or cyanoacrylate glue, Devcon Flex Super Glue No. 30340 (Devcon Consumer Products. Riviera Beach, Florida, USA), or E60C0 Glue (Eclectic Products, Carson City. NV, USA).

Dimensions and quantities for 4 sizes:

| | | |
|---|---|---|
| 1. Tubing: 15.24 cm (6 in) long | 4 pcs. | |
| 2. Foam: 12.7 cm (5 in) × 4.76 to 6.35 mm (0.189 to 0.25 in) | 4 pcs. | |
| 3. PDMS: 1,000 cs | 2 ml/MEDE | |
| 1. Tubing: 10.46 cm (4.12 in) long | 1 pcs. | |
| 2. Foam: 7.92 cm (3.12 in) × 4.76 to 6.35 mm (0.189 to 0.25 in) | 1 pcs. | |
| 3. PDMS: 1,000 cs | 1.65 ml/MEDE | |
| 1. Tubing: 50.6 mm (2.0 in) long | 4 pcs. | |
| 2. Foam: 25.4 mm (1.0 in) × 4.76 to 6.35 mm (0.189 to 0.25 in) | 4 pcs. | |
| 3. PDMS: 1,000 cs | 0.5 ml/MEDE | |
| 1. Tubing: 15.24 cm (6.0 in) long | 4 pcs. | |
| 2. Foam: 12.7 cm (5 in) × 3.16 to 3.81 mm (0.125 to 0.15 in) | 4 pcs. | |
| 3. PDMS: 1,000 cs | 1.33 ml/MEDE | |

The compressible gas in the preferred embodiment is air. The viscosity of the silicone fluid was selected from a range of about 50 cs to 10,000 cs. The viscous liquid is preferred to have a viscosity of less than 10,000 cs and generally in a range from about 50 cs to 1,500 cs. A preferred, effective range of viscosity for the uses described is about 500 cs to 1,500 cs.

FIG. 12 shows a typical MEDE using an envelope 48 of elastic material. The end 50 of the envelope is sealed to prevent any leakage. The sealing can be accomplished by any suitable means, which may include the use of vulcanizing fluid, adhesive, or mechanical clamping. The drawing illustrates a representative mechanical clamp or band of shrinkable tubing 58 closing end 50. If adhesive is used, ethyl cyanoacrylate glue is preferred.

Figure 13:
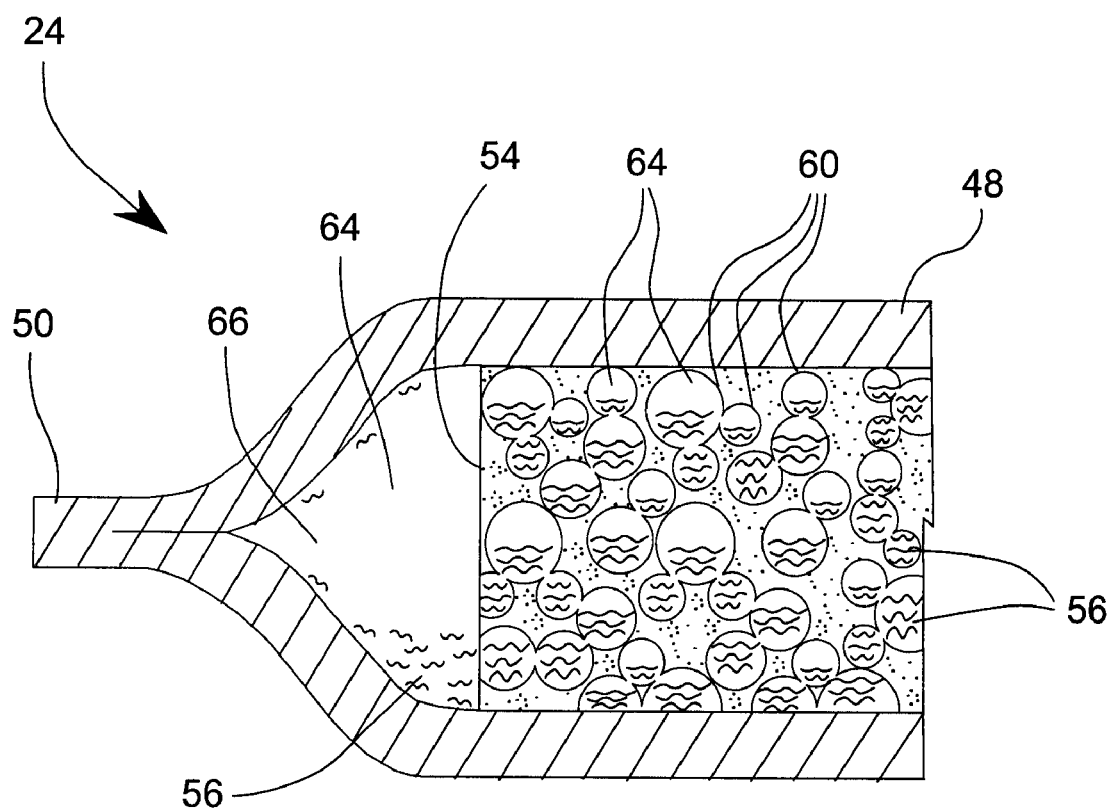
FIG. 13 is an enlarged, fragmentary view of one end of the mechanical energy-dissipative element of FIG. 12.

FIG. 13 is an enlarged view of a small region of this MEDE. In this view, the open cell foam body 54 is enlarged to conceptually show cells 60 that are filled to varying degrees with viscous liquid 58. Some cells are partially filled with air 64 or other compressible gas such as nitrogen. The apertures between cells are relatively smaller than the transverse dimension of the cells, themselves. The end of the envelope provides a void 66 that may contain air but also serves as a reservoir that receives viscous liquid when the MEDE is compressed. This viscous liquid can return to the cells when the MEDE returns to uncompressed configuration.

A comparison of FIGS. 10 and 11 provide a conceptual illustration of a MEDE in compressed and uncompressed configurations. In the compressed configuration of FIG. 11, the viscous fluid has been displaced either into cell areas that previously contained gas or into void areas 66. FIG. 10 shows a MEDE 24 before being subjected to shock loading. FIG. 11 shows a similar MEDE under dynamic shock loading, i.e. when the velocity of an associated disk drive is near zero at the end of a shock event. Both FIGS. 10 and 11 show a single sealed end 50 of the envelope, although a similar sealed end may be used at both ends of a MEDE. When the envelope is produced from a longer length tube, both ends are sealed. The length and cross-section of an MEDE may be different along different sides of a hosted device or hard disk drive. In order to produce different sizes, different lengths and diameters of latex tubing may be employed.

There are two mechanisms, both macroscopic, for dissipation and storage of mechanical energy. The flow of viscous liquid from a region of cells under compression to a region of cells under no direct load causes capillary flow through a multitude of orifices and also causes flow with respect to cell walls. This leads to energy dissipation. The accompanying deformation of the cell walls of the foam and of the elastic envelope, which may be stretched, leads to storage of elastic energy. This energy essentially restores the MEDE 24 to its unloaded condition when the shock transient has subsided. The viscosity of the liquid and the volume of the cells are determined experimentally for reducing the shock transferred by the module case 26 to a hard disk drive or other hosted device 22 to an acceptable level, such as may be specified by the manufacturer.

The effectiveness of a MEDE was tested using a module 20 containing a 3.5-inch form factor Hitachi Deskstar drive model # 07N9685. The module 20 was dropped from a height of 30.48 cm (1 foot) to 1.52 m (5 feet) so that the broad side of the module impacted a linoleum-over-concrete slab. An accelerometer (model U350B23 made by PCB Pizotronics) was placed on the base of the drive thru a hole created in the case of the module. LeCroy's digitizing Oscilloscope (model DDA125) was used to record accelerometer output. The test showed that less than 200 G force was registered at five feet by the accelerometer and thus experienced by the drive. A check subsequent to this five-foot drop verified drive read back of pre-recorded data without any errors, demonstrating that read/write functionality remained intact. No known protective system in current commercial use has an ability to protect such a drive from five feet of free fall onto a linoleum surface.

The parameters considered in the design of the MEDEs for the preferred embodiment are the thickness of the latex envelope, type of foam, type of fluid, its viscosity & quantity, and type of sealing procedure. For the preferred embodiment, Flex brand cyanoacrylate glue is used to seal the ends. However, tubing made of heat-shrink material could be slipped over the ends and heat-shrunk to seal one or both ends, exemplifying a type of mechanical sealing.

The first failure mode of a disk drive is due to head-slap caused by lift off and subsequent drop of the magnetic transducer that is suspended on a spring lever above the surface of the recording media. Head-slap damages either the magnetic transducer or the recording media. Damage to the recording media generates debris that will later result in the magnetic transducer "crashing" onto the recording media. The shock at which head-slap occurs defines the upper limit acceptable for the shock transmitted to a hosted hard disk drive 22. The arrangement and design of the MEDE 24 is critical in the axis in which the head will lift off the media because the transmitted shock has to be reduced to less than the upper limit acceptable to the hosted hard disk drive 22. The overall benefit of the MEDE 24 is to limit the deceleration experienced by the hard disk drive 22 to less than 200 G. This is the usual shock limit specification for currently available hard disk drives. Deceleration amplitudes below this limit do not result in head-slap. The length and number of the MEDEs 24 used to protect from shock in this direction are the controlling factors in design of the preferred embodiment.

The second failure mode for shock to a disk drive involves the positioner for the magnetic transducer moving from the "landing area" onto the recording area of the media. Special features of the "landing area" prevent the head from sticking to the magnetic media when the disks are not spinning. The disk drive contains a latch assembly to prevent motion of the positioner unless the disks are spinning. With large rotational shock on the same axis as the axis of rotation for the positioner, the latch will fail. Utilizing the viscosity of the viscous liquid, the mechanical energy dissipative elements are most effective against rotational shock because the transmitted shock is reduced to a lower level than possible with prior known devices.

Form factor is an important consideration in producing a practical product within an industry populated by large numbers of related, pre-distributed hardware units. An oddly sized product might be orphaned for no other reason than its lack of conformity with the popular size of similar products. Especially in the field of electronics and computer hardware, component sizes tend to diminish rather than increase. Achieving a successful, functional product within a standard form factor can be a difficult challenge, especially in the field of ruggedizing electronic components. Ruggedizing a component typically requires adding protective elements around the component. Nevertheless, the size of a ruggedized component must be similar to that of a non-ruggedized component so that it fits within available bays or spaces. The ruggedized component must be spatially compatible with related, pre-distributed hardware.

As described, the module 20 successfully contains a 3.5-inch form factor hosted device such as a hard disk drive 22. The size of case 26 is 35 mm×115 mm×190 mm (1.38 in×4.53 in×7.54 in) and is sized to fit within pre-distributed hardware having a bay of suitable size to accommodate 5.25-inch form factor devices. Case 26 can hold both the hosted hard disk drive and the mechanical energy dissipative elements (MEDEs) 24. It would be desirable to further improve the ruggedized qualities of the host module 20 without increasing the size of case 26.

One opportunity for improving the ruggedization of a module arises when a substitute for the hosted device is available in a smaller format. One example of a smaller hosted element might be a hard disk drive of 2.5-inch form factor, which can be substituted for a disk drive of 3.5-inch form factor within the same case 26. However, a substitution can lead to additional technical problems, such as an increased tendency for the smaller hosted device to shift position on the case 26. Also, the smaller disk drive may lack sufficient contact surfaces to benefit from the originally designed structure and arrangement of the mechanical energy dissipative elements 24. Consequently, employing a 2.5-inch form factor hosted device in case 26 can require a reconfiguration of the internal components of the module.

Figure 14:
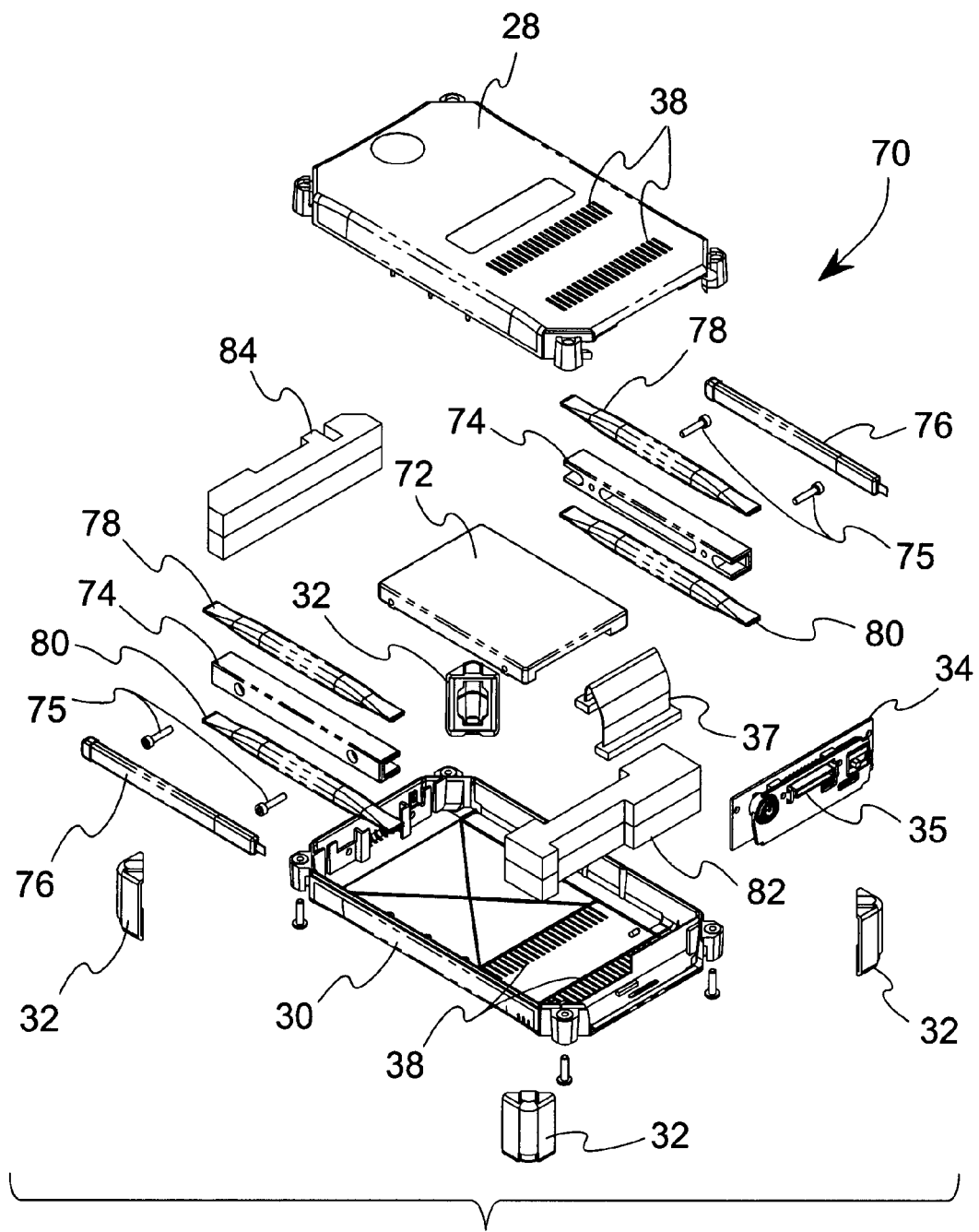
FIG. 14 is a view similar to FIG. 1 of a second embodiment of the invention.

With reference to FIG. 14, a second embodiment of the invention is a host module assembly 70, similar to module assembly 20, but hosting a smaller hosted device such as a 2.5-inch form factor disk drive. In FIG. 14, components that are the same or closely similar to those in FIGS. 1-13 are assigned the previously used reference numbers.

The hosted device 72 is smaller in physical dimensions than the former disk drive 22. In order to prevent the smaller hosted disk drive from moving excessively in the case 26, right and left longitudinal side extensions or rails 74 are added to disk drive 72. The rails bring the housing of drive 72 to approximately the width of a 3.5-inch form factor disk drive 22, effectively widening the housing of the hosted disk drive 72.

Rails 74 are longitudinally elongated with four longitudinally extending walls or faces and two transverse end walls or faces. The rails 74 may be thicker and longer than disk drive 72. The rails can be mounted to the disk drive with the excess length at either end of the disk drive or distributed between both ends. The rails are sized to preserve a clearance with top, bottom and sidewalls of the case, when case top portion 28 and the case base portion 30 are assembled around the hosted device. The rails 74 are attached to the hosted housing 72 by suitable fasteners such as screws 75 in order to secure the rails and housing as a unit. The longitudinal inner sidewall of each rail is juxtaposed to a sidewall of the hosted housing 72. The remaining three longitudinal rail walls are a top wall, a bottom wall, and an outer sidewall.

Due to the comparative thinness of the smaller disk drive 72, the preferred arrangement of mechanical energy dissipative elements is modified. Specifically, at least one MEDE 76 is located against the outer sidewall of each rail, so that in the assembled case, the MEDE 76 will be located between the rail and a sidewall of the case. At least one other MEDE 78 is positioned against the top wall of each rail 74, so that in the assembled case, the MEDE 78 will be located between the rail and the top wall of the case. At least one further MEDE 80 is positioned against the bottom wall of each rail 74, so that in the assembled case, the MEDE 80 will be located between the rail and the bottom wall of the case. The resulting structure encapsulates each rail on three longitudinal faces by the use of at least three separate MEDEs 76, 78, 80. The rails provide predictable, smooth contact surfaces for reacting with the associated MEDES. In this way, the rails solve the technical problem that the surfaces of a hosted device are unpredictable in quality and suitability for interaction with MEDEs. Hosted devices may have been designed and manufactured without any anticipation that they should be compatible with MEDEs. Thus, a hosted device may have rough or uneven surface structures.

The hosted device or 2.5-inch form factor disk drive 72 of FIG. 14 is of lighter comparative weight or lower mass than a typical 3.5-inch form factor disk drive. Typically, the former is about 113 gm (4 oz) while the latter is about 680 gm (24 oz). To best accommodate the needs of the lighter disk drive, the composition of mechanical energy dissipative elements is modified. The body of open cell foam 54 may be chosen as Confor CF-42 Pink or an equivalent, which is more easily compressed and of lower tensile strength than CF-45 Blue or CF-47 Green or their equivalents. The transverse dimensions of the foam bodies 54 may be square, such as 9.53 by 9.53 mm (0.375 by 0.375 inches), which is approximately double the thickness of MEDEs 24 described for use with 3.5-inch form factor disk drives. The MEDEs 78 and 80, placed against the top and bottom surfaces of the rails of a 2.5-inch form factor disk drive, may be five inches long, while the side edge MEDEs 76 are four and one-half inches long.

The MEDEs may be adhered at least temporarily to the rails, such as by double-sided tape, in order to ensure that they maintain their desired positions through the assembly process. Alternatively, the MEDES 76, 78, 80 or any of them may be adhered to the appropriate locations on the inside surface of case 26 for purposes of assembly. The MEDEs operate in direct contact with the top, bottom and outer sidewall surfaces of the rails rather than with the walls of the hosted housing 72, itself. This arrangement produces a substantial open top space and open bottom space between the hosted housing 72 and the respective case top cover 28 and case base 30. At least one set of top and bottom case vents 38 is in communication with this large open space adjacent to each major surface of the hosted housing 72.

The front and rear ends of hosted housing 72 enjoy a substantial clearance from the front and rear ends of the case. These clearances are partially filled by a front block foam damper 82 and a rear block foam damper 84. Either foam damper may be layered, split, or slotted to permit a cable such as cable 37 to pass through the damper in good alignment with a connector on the hosted housing. Optionally, each block of foam can be suitably notched and contoured to permit airflow through the previously described vents and to accommodate the interconnection and operation of other components in the case, such as circuit board 34, an internal cable 37, as well as any desired optional additions, such as a fan. The block foam dampers 82, 84 also are contoured to contact the case walls over broad areas to ensure efficient operation. The block foam dampers oppose the end walls of the rails 74 and space the rails from the end walls of the case. Because the rails are longer than the hosted device, the rails contact the foam blocks 82, 84 and establish front and rear gaps between the foam blocks and the front and rear of the hosted device. This spacing allows ventilation currents through the case between top and bottom of the hosted device.

The size of a 2.5-inch form factor disk drive is a 3.5-inch form factor case allows substantial end space in the case. The foam dampers are created large enough to prevent a disk drive 72 from sliding into the front or rear ends of the case even during a shock or impact event. Due to their large size in the large front and rear areas, the foam dampers are effective substitutes for MEDEs at the ends of the disk drive 72. The resulting structure of damping elements places the MEDEs 76 at the sides, MEDEs 78 at the top, and MEDEs 80 at the bottom of the disk drive, while foam dampers are found at both front and rear end.

The case further includes corner bumpers 32 that provide protective and sealing functions as previously described.

The rails 74 provide a surface area for face-to-face interaction with the MEDEs. In addition, the rails carry this surface area remotely from the disk drive and serve to isolate the disk drive from directly receiving shock. The rails provide smooth contact surfaces at their top, bottom and outer side faces, where MEDEs interact. These smooth faces provide broad, uniform, substantially uninterrupted reaction surfaces that interface with the MEDEs. Such uniform surfaces protect the MEDEs from damage by irregularities as might be encountered in the side structures of a hard drive or other hosted housing. These factors improve the ruggedized qualities of the module 70.

Figure 17:
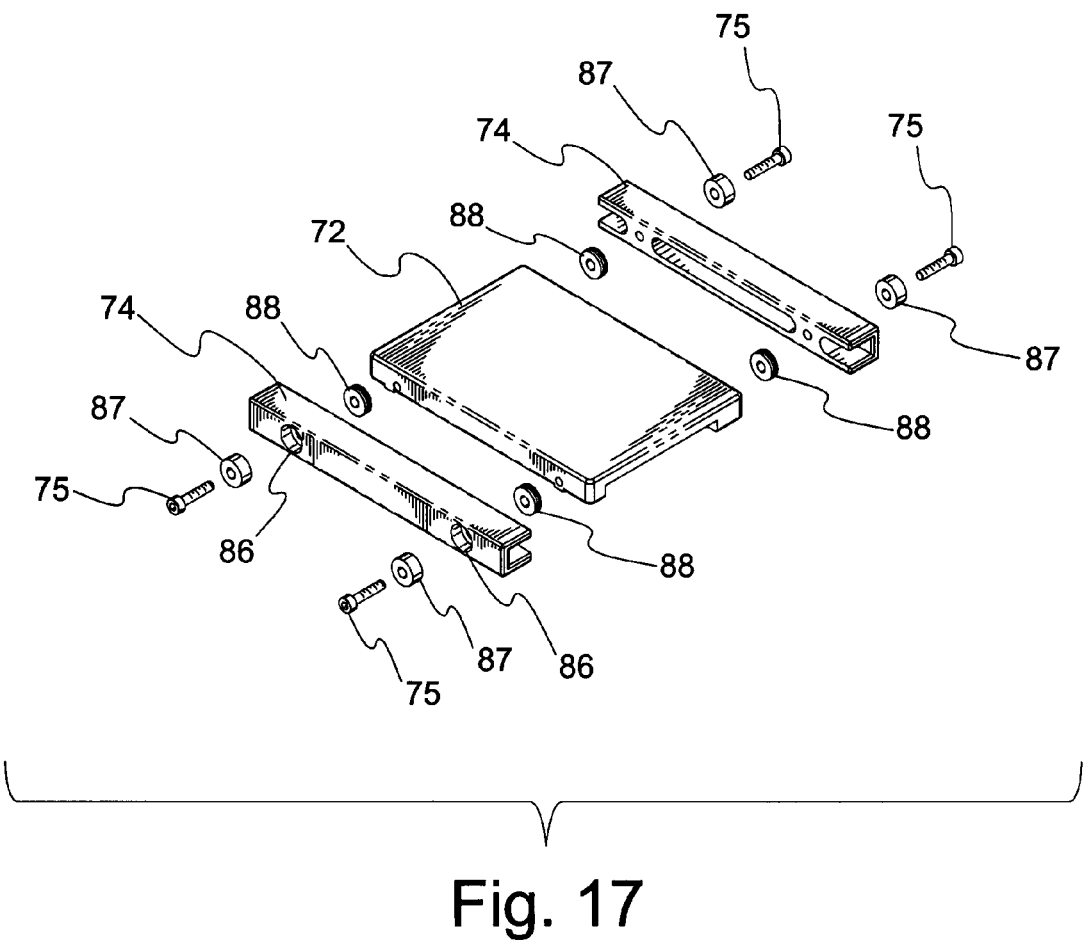
FIG. 17 is an assembly view of the second embodiment, showing a modified version.

With reference to FIG. 17, the screws 75 that attach the rails to the hosted device may be suspended in rubber or elastomer grommets or other resilient spacing dampers. Thus, screw hole bores through the rails 74 may be counter bored from the outer sidewall, creating spacer reception areas 86 each sized to receive a resilient spacer 87. The spacers 87 are suitably sized as compared to the screws 76 to float each screw in one of the spacers and isolate the screw from direct contact with a rail 74, when the screws are engaged through a rail and into the hosted device or disk drive 72. The rails have a substantial thickness, such as thirteen millimeters (one-half inch). Due to this thickness, more than one damping spacer may be required to achieve a maximum damping result. Additional elastomer spacers or grommets 88 may be carried between the rails 74 and the hosted device 72, in-line over the screws to serve as dampers between the rails and hosted device. According to other arrangements, damping spacers or grommets may be placed between the screw heads and the rails, or from either end within the screw passages in the rails. The grommets provide additional protection against shock and vibration for the hosted device.

Figure 15:
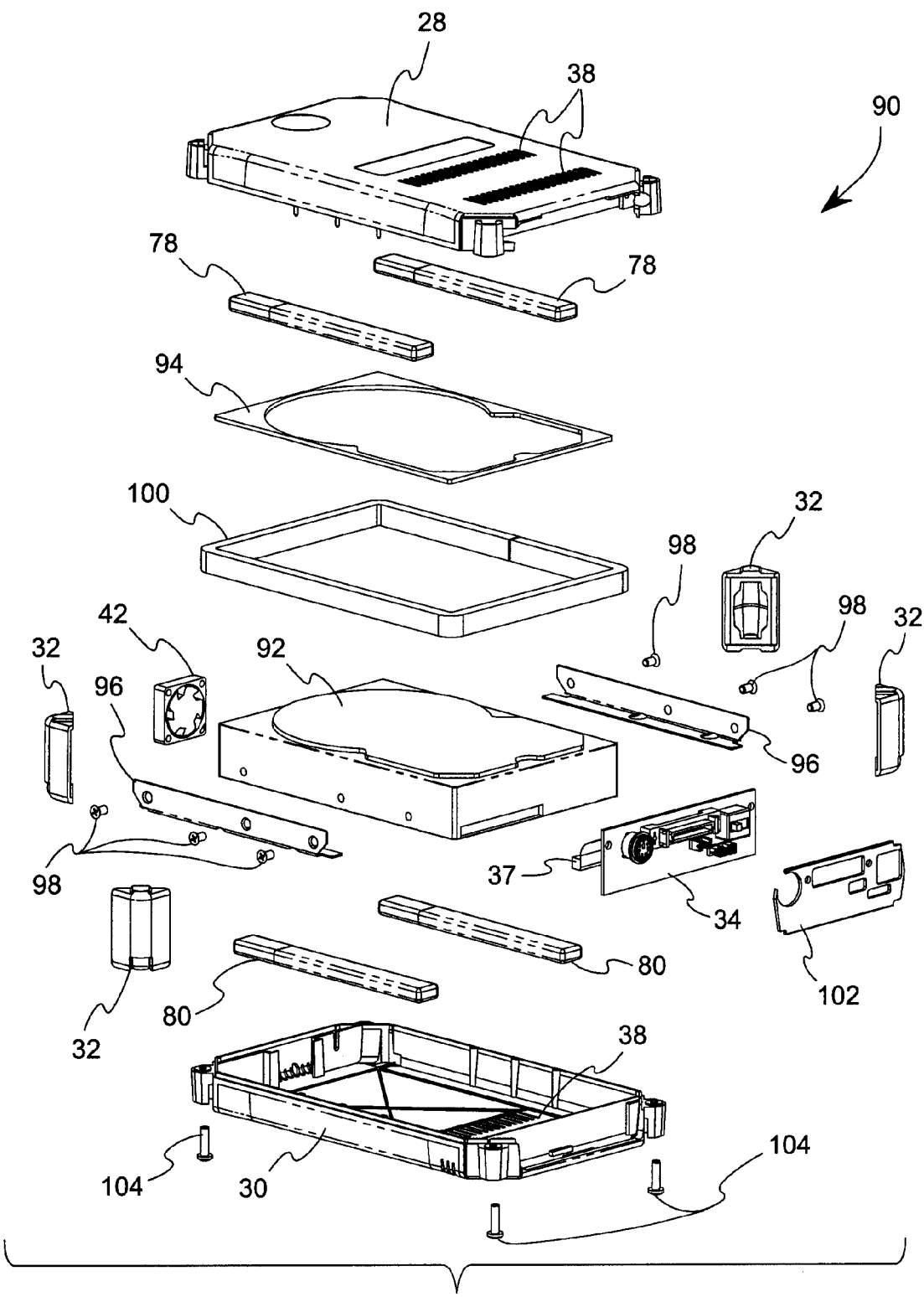
FIG. 15 is a view similar to FIG. 1 of a third embodiment of the invention.

The advantages gained by using rails on a smaller hosted device, such as a 2.5-inch form factor disk drive, can be translated to provide improved protection for a larger hosted device. Thus, FIG. 15 shows a third embodiment in which a host module 90 carries a 3.5-inch form factor hosted device 92. As in the FIG. 14, components of FIG. 15 that are the same or closely similar to those in FIGS. 1-14 are assigned the previously used corresponding reference number.

The hosted device 92 may be a hard disk drive that is similar in overall size to a 3.5-inch form factor disk drive 22 of the first embodiment. However, a difference in disk drive 92 is that the top surface of the hosted housing 92 is irregular in contour. The top surface of the housing 92 is contoured in various ways to accommodate interior components. Hard disk drives typically are designed and manufactured for general-purpose usage and not specifically for use in a module assembly 20, 70, or 90. Irregular contours of various descriptions may be incorporated into the housing for the disk drive according to the manufacturer's preference and need. Thus, the illustrated irregular contour is an example and not a limitation.

Any surface having irregular contour can be a poor reaction surface for carrying and cooperating with a MEDE. The MEDE may assume a partially distorted and compressed configuration over a contact area with the irregular features. When shock is received, the distorted area of the MEDE could fail prematurely. An irregular surface also is undesirable because it could cause the MEDE to shift its location over time. The MEDE could shift away from its protective position on the raised irregular contour, leaving the raised contour of the hosted housing unprotected or less protected against shock. Thus, a MEDE is best contained against and between surfaces of uniform contour and uniform spacing, without sharp structures that could puncture the MEDE.

As a protection to minimize the problem presented by an irregular surface of disk drive 92, a leveling device such as a gasket 94 is applied over the irregular top surface of the disk drive 92 in the view of FIG. 15. The gasket is of a thickness, pattern, and contour to produce a uniform top surface on disk drive 92. The central cutout of gasket 94 is readily seen to be a close match for the irregular raised pattern on the original top wall of the disk drive 92. Rubber or similar resilient material is a suitable choice for constructing the gasket 94. When gasket 94 is applied to the top wall of disk drive 92, it produces a smooth mounting surface for receiving a MEDE and for the MEDE to push against during a shock event.

Leveling the contact surface of a hosted device is a partial solution to the problem of irregularities. A further and related problem is that a leveled surface may have areas of different widths having differing qualities. Thus, a device for creating a uniform surface can be applied along selected portions of a hosted device, with or without the associated use of a leveling gasket. As further shown in FIG. 15, a surface layer 95 of flexible and tough sheet material covers the gasket 94 and a portion of the top surface of a hosted 3.5-inch form factor disk drive 92. A suitable material for layer 95 is Mylar brand polyester film, a trademark and product of E.I. du Pont de Nemours and Company of Wilmington, Del., United States of America and worldwide. This top layer covers the perimeter of the top surface of disk drive 92, covering portions of the gasket 94, where used, and portions of the original top surface. A central portion of the surface layer 95 is cut-away or open to vent heat from the disk drive. The uniform surface layer 95 is especially desirable to cover screw heads that otherwise may be exposed through gasket 94 and to establish a uniformly wide surface at appropriate areas to receive and react with a MEDE.

Side rails 96, such as right and left side rails, are attached to disk drive 92 as additional means to isolate the disk drive from shock and to provide a smooth mounting and reaction surface for a MEDE. In this embodiment, the disk drive is of a form factor already matching the form factor of the case 26 and has little spare room on lateral sides. Thus, the rails 96 are formed of shaped sheet metal and add only minimally to the lateral dimensions of the housing of disk drive 92. Each rail 96 is configured as an L-shaped angle bracket in which two planar plates of sheet material meet along a perpendicular junction of major faces. A first planar plate of the rails lies parallel to a sidewall of the disk drive 92 and partially overlaps it, serving as a mounting plate for attaching the rail to the disk drive 92. The second planar plate lies at an acute angle to the first, typically perpendicular to the first and offset from a major face of the disk drive as a free wall. The free wall lies parallel to a major surface such as the top or bottom face of the disk drive 92 and at least partially overlaps it. Thus, each rail adds to the lateral dimension of the disk drive 92 only by approximately the thickness of the sheet material. Screws 98 attach the rails 96 to the disk drive 92 at standard mounting positions provided by the disk drive manufacturer, such as through the side plates of the rails. The screws 98 have modified heads designed to be smooth and without sharp edges.

A significant benefit of rails 96 is that the second planar plate or free wall is offset from a juxtaposed major face of the disk drive and overlaps an area of the disk drive that typically carries an exposed printed circuit board or other irregular surface. The components of a printed circuit board typically are sharp and irregular, such that they could damage a MEDE by contact. The L-shaped rail formed of sheet metal can provide a strong, pressure resistant freestanding wall over an exposed irregularity, especially over an irregularity that is unsuited for coverage by a gasket 94. The free wall of the rail forms a suitable reaction surface over an exposed printed circuit board to allow a MEDE to function properly. The free wall of the rail provides both a suitably large area and smooth surface suitable to serve as the reaction wall for a MEDE. Thus, the use of L-shaped rails or another such device for providing a free wall allows the use of MEDEs against a broader range of hosted devices, including those with exposed printed circuit boards or other irregular surfaces, without substantially increasing the dimensions of the hosted device.

Mechanical energy-dissipative elements provide shock protection to the major faces of the disk drive 92. Two MEDEs 78 are applied to the top face of disk drive 92 in proximity to respective opposite side edges of the top surface, against gasket 94 or Mylar surface covering 95. These right and left top MEDEs can be adhered to the gasket or Mylar covering, at least temporarily for assembly, by double-side tape. An additional two MEDEs 80 are applied to the bottom of disk drive 92 against the respective bottom plates of the rails 96. These right and left bottom MEDEs are adhered to the rails, at least temporarily, by a double-sided tape. With a longitudinal dimension of about 4.5 inches, MEDEs 78 and 80 are almost as long as the front-to-rear dimension of the disk drive 92. These MEDEs are approximately centered along the side dimension of the disk drive 92 in order to provide protection throughout the length of the drive.

Although the rails 96 contribute little to the width of the disk drive 92, due to the constraints of meeting 3.5-inch form factor dimensions, their presence possibly could compromise the function of a MEDE placed on the side plate of the rail. In the embodiment of FIG. 15, a perimeter band 100 replaces such side MEDEs. This band is selected for good shock absorption qualities. A suitable band is formed of a plastic foam sheet material. The band may be about 13 mm (0.5 inch) in height and the sheet may have a thickness of about 7.9 mm (0.3125 inch). A preferred foam for this purpose is open cell urethane foam such as CF-47 Green, supplied by E-A-R Specialty Composites of Indianapolis, Ind., sold under trademark Confor, as mentioned, above. Double-sided tape can adhere the foam strip to the disk drive and rails.

The disk drive 92, with attached rails, MEDEs, and foam perimeter strip, is assembled into the case by uniting housing top 28 to base 30. Such features as a fan 42, electronics board 34, cable 37, and false wall 102 are included as needed or desired. Corner screws 104 secure the case halves together. Corner bumpers 32 cover the screws and provide additional shock protection at the corner edges.

Figure 16:
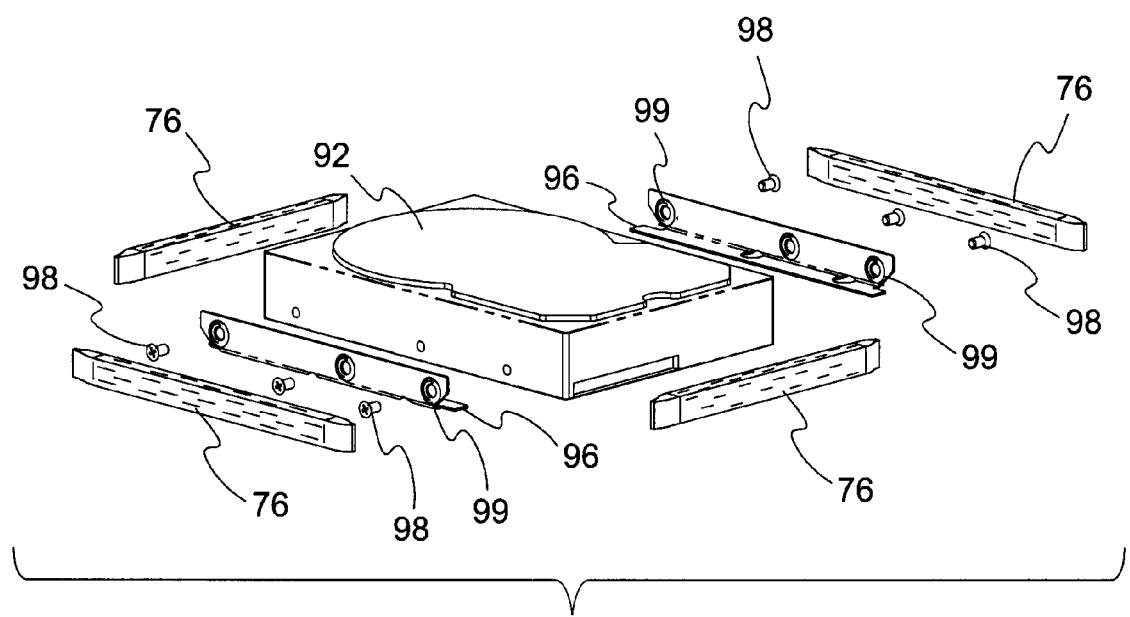
FIG. 16 is an assembly view of the third embodiment, showing a modified version.

In a variation of the arrangements shown in FIG. 15, FIG. 16 shows a hosted device 92 that is suited to receive side rails 96. The side rails can be the L-shaped rails 96, although other shapes also may be suitable. Sidewall screws 98 attach the rails to the sidewalls of the case. Side MEDEs 76 are positioned against the sidewalls of the rails and against the front and rear sides of the device 92.

With or without the rails 96, the hosted device 92 includes at least two pairs of two opposite sidewall faces, which are the front and rear faces and the two opposite side faces. These sidewall faces are positioned in a substantially continuous perimeter around the hosted device. At least four mechanical energy dissipative elements 76 surround the hosted device 92 at the perimeter established by the sidewalls.

Optionally, where lateral space is sufficient, the use of thin sheet metal rails 96 may permit the use of dampers 99, which are positioned in juxtaposition to the rails and screws to provide additional protection against transmission of shock and vibration. Dampers 99 may be of rubber or elastomer material. Rubber grommets are a suitable example. Preferably, the grommets are mounted in the screw passages of the rails, such that the ends of the grommets extend from both ends of the screw passage. The screws 99 fasten the grommets to the hosted device, and the grommets engage the rails, without any direct contact between the screws and rails.

Other possible arrangements include placement of the grommets between the rails and the hosted device, or placement of the grommets between the screw heads and the rails. As previously described, thicker rails 74, FIG. 14, may require the use of multiple grommets, such as separate grommets at the entrance face and exit face of a screw passage.

As described and illustrated, a hosted device 72, 92 is carried in a host module assembly 26 and protected from deleterious mechanical shocks and vibrations. Side rails 74, 96 are attached to opposite edges of the hosted device 72, 92 to isolate the hosted device from direct reception of shock. A plurality of elastic dampers 76, 78, 80 are applied between the side rails 74, 96 and the host module 20 in sufficient number and position to suspend the hosted device within the host module without substantial shock-transmitting contact with the host module other than through the side rails and dampers.

This method and apparatus can be applied to a wide variety of hosted devices and hosted housings. It is especially useful when applied to disk drives where space and size can be at a premium in order to comply with a known or popular form factor. At least some of the dampers 24 can be of a space-efficient and size-efficient variety in which an elastic envelope 48 contains a body 54 of open cell material having orifices communicating at least some of the cells 60 with each other, a viscous and electrically nonconductive liquid 56 filling at least some of the cells, and an air space 66 containing compressible gas 64. The method enables the use of other types of dampers to supplement the MEDEs 24. These may include foam plastic blocks 82, 84, foam plastic bands 100, and grommets or other resilient spacers 87, 88, 99.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

What is claimed is:

1. A host module assembly for protecting a hosted device from shock and vibration, comprising:
   a case comprising a major upper case surface and a major lower case surface, configured with at least one external corner, and adapted to receive a hosted device within said case and to receive at least one damper against shock between the hosted device and the case;
   a hosted device located within the case;
   at least one damper against shock located between said hosted device and the case; and
   at least one bumper formed of elastomer material and engaged with said at least one corner, wherein said bumper comprises an upper bumper surface extending above said upper case surface and a lower bumper surface extending below said lower case surface, wherein one of upper or lower bumper surfaces defines a boss and the other of said upper or lower bumper surfaces defines a boss recess.

2. The host module assembly of claim 1, wherein:
   said case is an assemblage of at least a base unit and a cover unit that meet at a joint line to form said; case said bumper is attached over a portion of both said base unit and said cover unit, securing together the base unit and cover unit.

3. The host module assembly of claim 2, wherein said base unit comprises a combination of said lower case surface and a sidewall.

4. The host module assembly of claim 2, wherein said cover unit comprises a combination of said upper case surface and a sidewall.

5. The host module assembly of claim 2, further comprising:
   an upper sidewall peripherally connected to said upper case surface and depending therefrom; and
   a lower sidewall peripherally connected to said lower case surface and extending upwardly therefrom;
   wherein said upper sidewall and lower sidewall meet at said joining line.

6. The host module assembly of claim 1, wherein:
   said damper against shock comprises a mechanical energy dissipative element.

7. A host module assembly for protecting a hosted device from shock and vibration, comprising:
   a case formed of a top portion defining a top wall, a bottom portion defining a bottom wall, and a sidewall comprising an external corner, wherein said external corner includes a fastener mount formed of a part of said top portion and a part of said bottom portion and carrying a fastener that attaches together the top portion and bottom portion, and wherein said case is adapted to receive a hosted device within the case and is adapted to receive a shock damper between the hosted device and the case;
   a hosted device located within the case;
   a shock damper located between said hosted device and the case; and
   a resilient bumper engaged over said fastener mount and covering said fastener, wherein said resilient bumper is configured with a top face that extends above said top wall and a bottom face that extends below said bottom wall, and wherein one of said top and bottom faces defines a boss and the other of said top and bottom faces defines a recess shaped similarly to said boss.

8. The host module assembly of claim 7, wherein said shock damper comprises a mechanical energy dissipative element.

* * * * *